(12) United States Patent
Chen et al.

(10) Patent No.: US 12,358,189 B2
(45) Date of Patent: Jul. 15, 2025

(54) ARTICLE AND METHOD OF MANUFACTURING THE SAME

(71) Applicant: OTRAJET INC., Taichung (TW)

(72) Inventors: Ching-Hao Chen, Taichung (TW); Liang-Hui Yeh, Taichung (TW); Ting-Wei Chen, Taichung (TW)

(73) Assignee: OTRAJET INC., Taichung (TW)

( * ) Notice: Subject to any disclaimer, the term of this patent is extended or adjusted under 35 U.S.C. 154(b) by 20 days.

(21) Appl. No.: 17/831,428

(22) Filed: Jun. 2, 2022

(65) Prior Publication Data

US 2023/0062429 A1   Mar. 2, 2023

Related U.S. Application Data

(63) Continuation-in-part of application No. 17/546,568, filed on Dec. 9, 2021, now abandoned.

(30) Foreign Application Priority Data

Aug. 23, 2021   (TW) .................................. 110130996
Nov. 5, 2021    (TW) .................................. 110141372

(51) Int. Cl.
  *B29C 44/00*   (2006.01)
  *A43B 17/00*   (2006.01)
  (Continued)

(52) U.S. Cl.
  CPC .......... *B29C 44/1266* (2013.01); *B29C 44/08* (2013.01); *B29C 44/1214* (2013.01); *B29K 2105/20* (2013.01); *B29L 2031/507* (2013.01)

(58) Field of Classification Search
  CPC .......... B29C 45/14073; B29C 44/1266; B29C 44/1285; B29C 44/1214
  See application file for complete search history.

(56) References Cited

U.S. PATENT DOCUMENTS 3,787,278 A * 1/1974 Ready ..................... B29C 44/10
                                                    428/218
4,409,163 A   10/1983 Van Manen
                  (Continued)

FOREIGN PATENT DOCUMENTS

CN    109878045 A    6/2019
DE      1704329 A1   5/1971
            (Continued)

OTHER PUBLICATIONS

Cakir, Sedef, et al. "The Effect of Foaming Agent on Mechanical and Physical Properties of Polypropylene." Materials Science, vol. 2, No. 1, Aug. 2018, https://doi.org/10.18063/msacm.v2i1.693. (Year: 2018).*

(Continued)

*Primary Examiner* — Alison L Hindenlang
*Assistant Examiner* — Andres E. Behrens, Jr.
(74) *Attorney, Agent, or Firm* — WPAT LAW; Anthony King

(57) ABSTRACT

An article includes a foamed member including a polymeric material, and a core embedded in the foamed member, the core includes a first surface, a second surface and a sidewall, the foamed member covers at least a portion of the first surface, and covers the entire sidewall and the entire second surface. A method of manufacturing an article includes providing a molding device including a first mold and a second mold, the first mold includes a supporting member protruded from an inner wall. The method further includes disposing a core on the supporting member; disposing the second mold over the first mold to form a mold cavity, the core is disposed within the mold cavity; injecting a first material into the mold cavity; and foaming the first material to form a first foamed member, wherein at least a portion of the first foamed member is in contact with the core.

20 Claims, 33 Drawing Sheets

(51) Int. Cl.
  *B29B 7/00*    (2006.01)
  *B29B 7/42*    (2006.01)
  *B29C 44/08*   (2006.01)
  *B29C 44/12*   (2006.01)
  *B29C 45/00*   (2006.01)
  *B29C 45/03*   (2006.01)
  *B29C 45/14*   (2006.01)
  *B29C 45/60*   (2006.01)
  *B32B 5/00*    (2006.01)
  *B32B 5/20*    (2006.01)
  *B29K 105/20*  (2006.01)
  *B29L 31/50*   (2006.01)

(56) References Cited

U.S. PATENT DOCUMENTS

| | | | | |
|---|---|---|---|---|
| 5,639,403 | A * | 6/1997 | Ida | B29C 45/77 |
| | | | | 264/272.17 |
| 7,763,676 | B2 * | 7/2010 | Moncla | C08J 7/043 |
| | | | | 524/576 |
| 11,267,175 | B2 | 3/2022 | Yeh et al. | |
| 2002/0180108 | A1 | 12/2002 | Koshiba | |
| 2003/0077346 | A1 | 4/2003 | Boyer et al. | |
| 2004/0080080 | A1 * | 4/2004 | Dalton | B29C 45/14073 |
| | | | | 264/278 |
| 2009/0255625 | A1 | 10/2009 | Fox et al. | |
| 2013/0276670 | A1 * | 10/2013 | Cernohous | B29B 9/14 |
| | | | | 524/13 |
| 2014/0084663 | A1 * | 3/2014 | Todd | A47C 7/20 |
| | | | | 297/452.48 |
| 2014/0223673 | A1 * | 8/2014 | Wardlaw | B29C 43/18 |
| | | | | 12/146 B |
| 2014/0239678 | A1 * | 8/2014 | Todd | A47C 7/20 |
| | | | | 297/180.12 |
| 2015/0315782 | A1 | 11/2015 | Belpaire et al. | |
| 2016/0346985 | A1 * | 12/2016 | Heusser | B29B 7/325 |
| 2017/0079440 | A1 | 3/2017 | Todd | |
| 2018/0093437 | A1 * | 4/2018 | Wardlaw | B29D 35/148 |
| 2019/0091906 | A1 * | 3/2019 | Bopp | B29C 33/123 |
| 2019/0263033 | A1 * | 8/2019 | Walia | B29C 37/0032 |
| 2021/0387384 | A1 * | 12/2021 | Shinohara | B29C 45/14688 |

FOREIGN PATENT DOCUMENTS

| | | | |
|---|---|---|---|
| EP | 1362683 | A2 | 11/2003 |
| EP | 1867455 | A2 | 12/2007 |
| EP | 3115260 | A1 | 1/2017 |
| FR | 3005619 | A1 | 11/2014 |
| JP | S5555817 | A | 4/1980 |
| JP | S561104 | A | 1/1981 |
| JP | S-56121745 | * | 9/1981 ......... B29C 44/1214 |
| JP | S56121745 | A | 9/1981 |
| JP | 2020172109 | A | 10/2020 |
| TW | 365521 | | 8/1999 |
| TW | 200607636 | A | 3/2006 |
| TW | M357216 | U1 | 5/2009 |
| TW | 201244656 | A1 | 11/2012 |
| TW | 201910112 | A | 3/2019 |
| WO | WO-2001079624 | * | 5/2001 ......... B29C 44/1214 |
| WO | 2001079624 | A1 | 10/2001 |
| WO | 2013138439 | A1 | 9/2013 |

OTHER PUBLICATIONS

Contributors to Wikimedia projects. "Foaming Agent." Wikipedia, Jun. 2021, web.archive.org/web/20210601062617/https://en.wikipedia.org/wiki/Foaming_agent. (Year: 2021).*
JPS-56121745 (Yamazaki) Sep. 1981 (online machine translation), [Retrieved on Aug. 14, 2023]. Retrieved from: Espacenet (Year: 1981).*
Extended European Search Report from the European Patent Office of EP patent application No. 22190679.5-1014 dated Sep. 12, 2022.
Office action, Cited References and Search report dated Jan. 5, 2023 issued by the Taiwan Intellectual Property Office (TIPO) for the Taiwanese application No. 111130746.
English Abstract of JP S56121745A.
Office action, Cited References and Search report dated Mar. 9, 2023 issued by the Taiwan Intellectual Property Office (TIPO) for the Taiwanese application No. 111130746.
Final Office action, Cited References and Search report dated May 12, 2023 issued by the Taiwan Intellectual Property Office (TIPO) for the Taiwanese application No. 111130746.
Extended Search Report from the European Patent Office of EP patent application No. 20213970.3-1014 dated Jun. 8, 2022.
Office Action from the Japan Intellectual Property Office of JP patent application No. 2021-199171 dated Aug. 9, 2022.
Office action, Cited References and Search report dated Jun. 7, 2022 issued by the Taiwan Intellectual Property Office (TIPO) for the Taiwanese application No. 110141372.
U.S. Appl. No. 17/582,798, filed Jan. 24, 2022.
U.S. Appl. No. 17/547,744, filed Dec. 10, 2021.
Office Action from the Japan Intellectual Property Office of JP patent application No. 2022-129338 dated Sep. 28, 2023.

* cited by examiner

ARTICLE AND METHOD OF MANUFACTURING THE SAME

CROSS-REFERENCE TO RELATED APPLICATION

This application is continuation-in-part (CIP) of U.S. patent application Ser. No. 17/546,568, filed on Dec. 9. 2021 and claims priority of Taiwanese patent application Ser. No. 110130996, filed on Aug. 23, 2021 and Taiwanese patent application Ser. No. 110141372, filed on Nov. 5, 2021, all of which are incorporated by reference in their entirety.

TECHNICAL FIELD

The present invention is related to an article and a method of manufacturing the same, and, in particular, to an article including a foamed member and a core and a method of manufacturing the same.

BACKGROUND

Article including a foamed member and a core has many advantages, such as high strength, low weight, impact resistance, thermal insulation, and others. The article can be made by adhere the foamed member and the core or interlock the two with each other, as such, at least an entire surface of the core maybe exposed. Therefore, there is a need for improvements to structures of the article including the foamed member and the core and the method for making the article.

BRIEF SUMMARY OF THE INVENTION

One purpose of the present invention is to provide an article and a method of manufacturing the same.

According to one embodiment of the present disclosure, an article is disclosed. The article includes a foamed member including a polymeric material; and a core embedded in the foamed member. The core includes a first surface, a second surface opposite to the first surface, and a sidewall between the first surface and the second surface, the foamed member covers at least a portion of the first surface, and covers the entire sidewall and the entire second surface.

According to one embodiment of the present disclosure, method of manufacturing an article is disclosed. The method includes providing a molding device, wherein the molding device includes a first mold, a second mold corresponding to the first mold, the first mold includes an inner wall and a supporting member protruded from the inner wall; disposing a core on the supporting member; and disposing the second mold over the first mold to form a mold cavity defined by the first mold and the second mold, wherein the core is disposed within the mold cavity; injecting a first material into the mold cavity; and foaming the first material to form a first foamed member. At least a portion of the first foamed member is in contact with the core.

BRIEF DESCRIPTION OF TI-FE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

RETAILED DESCRIPTION

Figure 1:
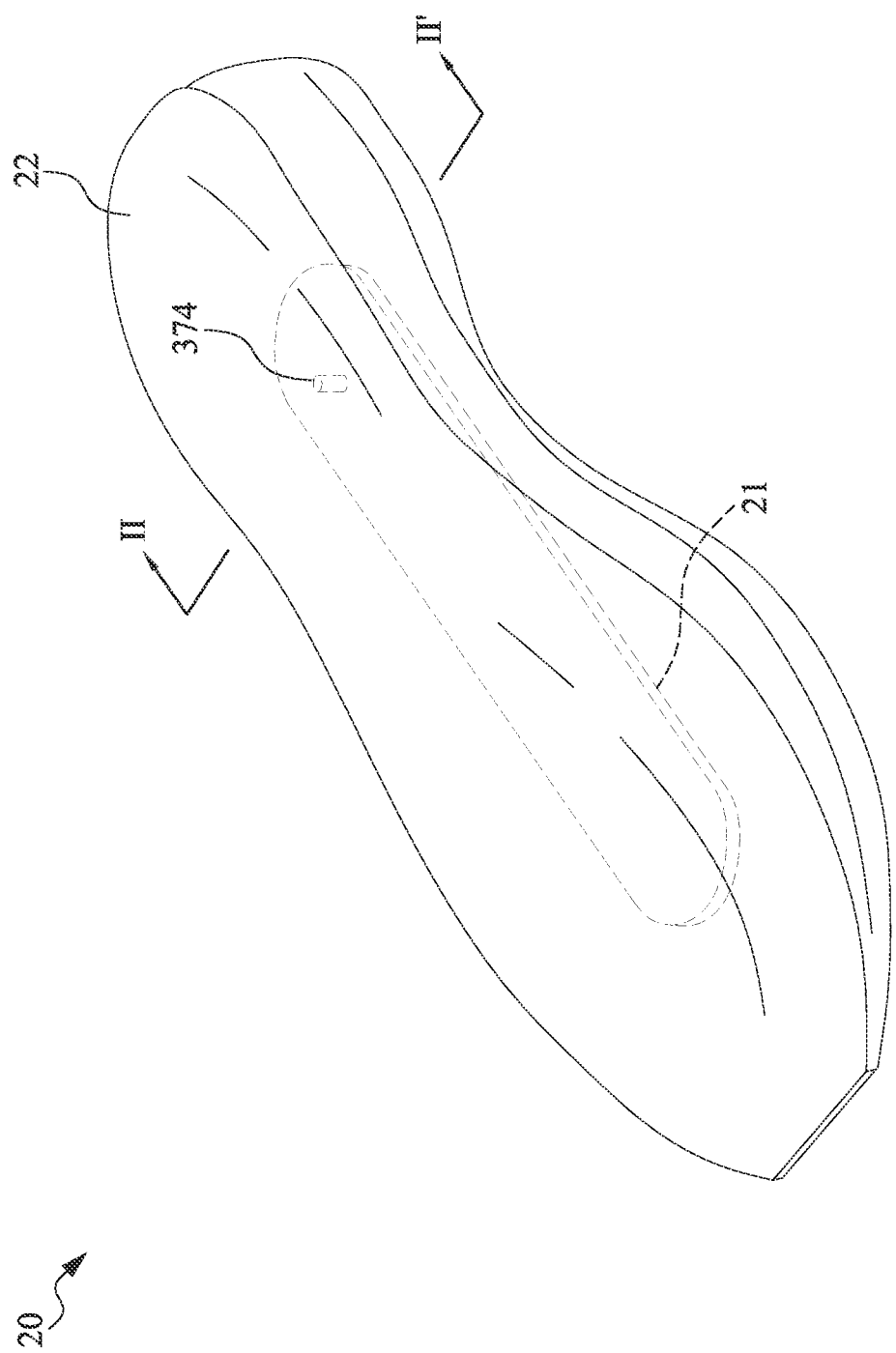
FIG. 1 is a schematic diagram illustrating an exemplary article according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages, such as those for quantities of materials, durations of times, temperatures, operating conditions, ratios of amounts, and the likes thereof disclosed herein, should be understood as modified in all instances by the term "about." Accordingly, unless indicated to the contrary, the numerical parameters set forth in the present disclosure and the attached claims are approximations that can vary as desired. At the very least, each numerical parameter should be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Figure 2:
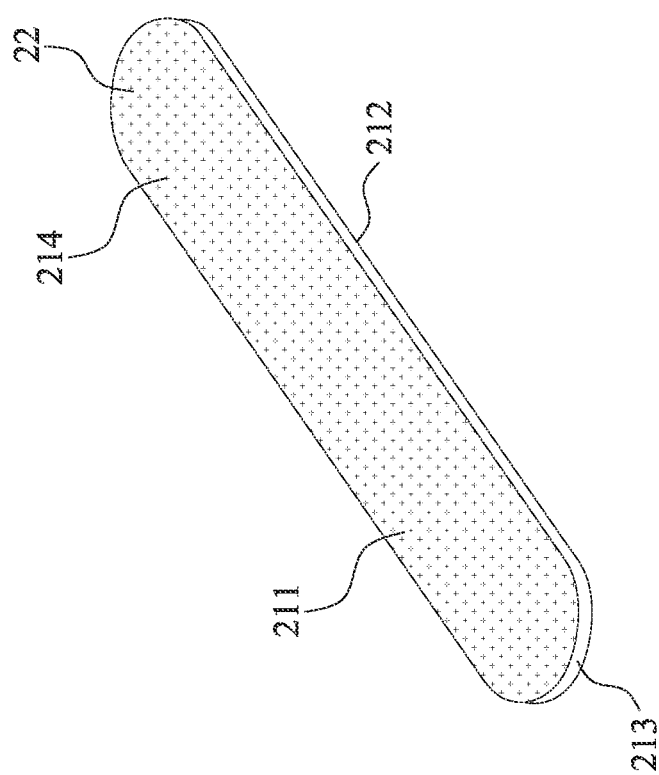
FIGS. 2 and 2A are schematic diagrams illustrating a portion of an exemplary article according to one embodiment of the present disclosure.
Figure 2A:
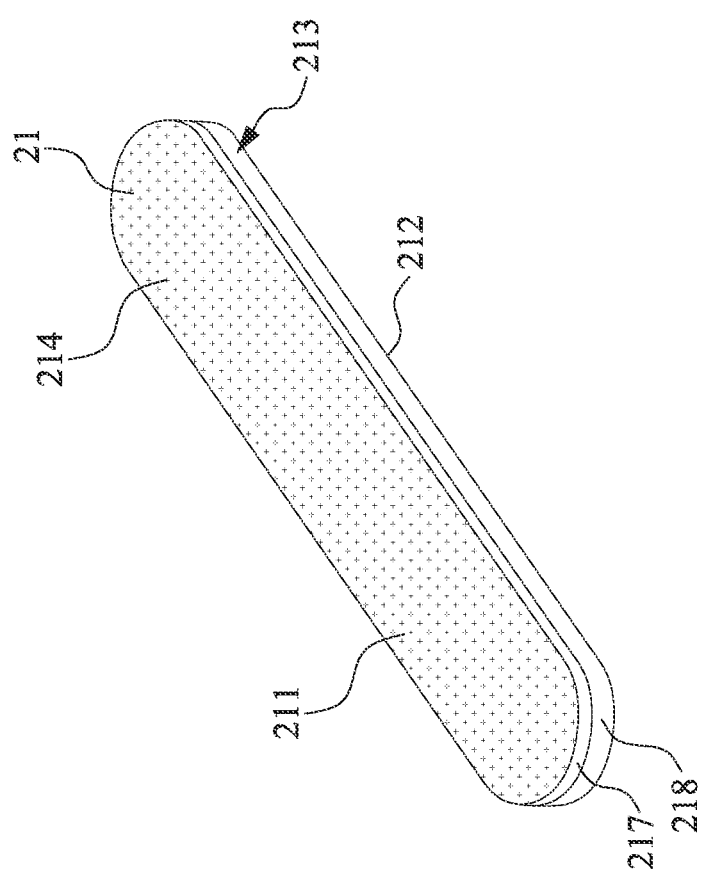
Figure 3:
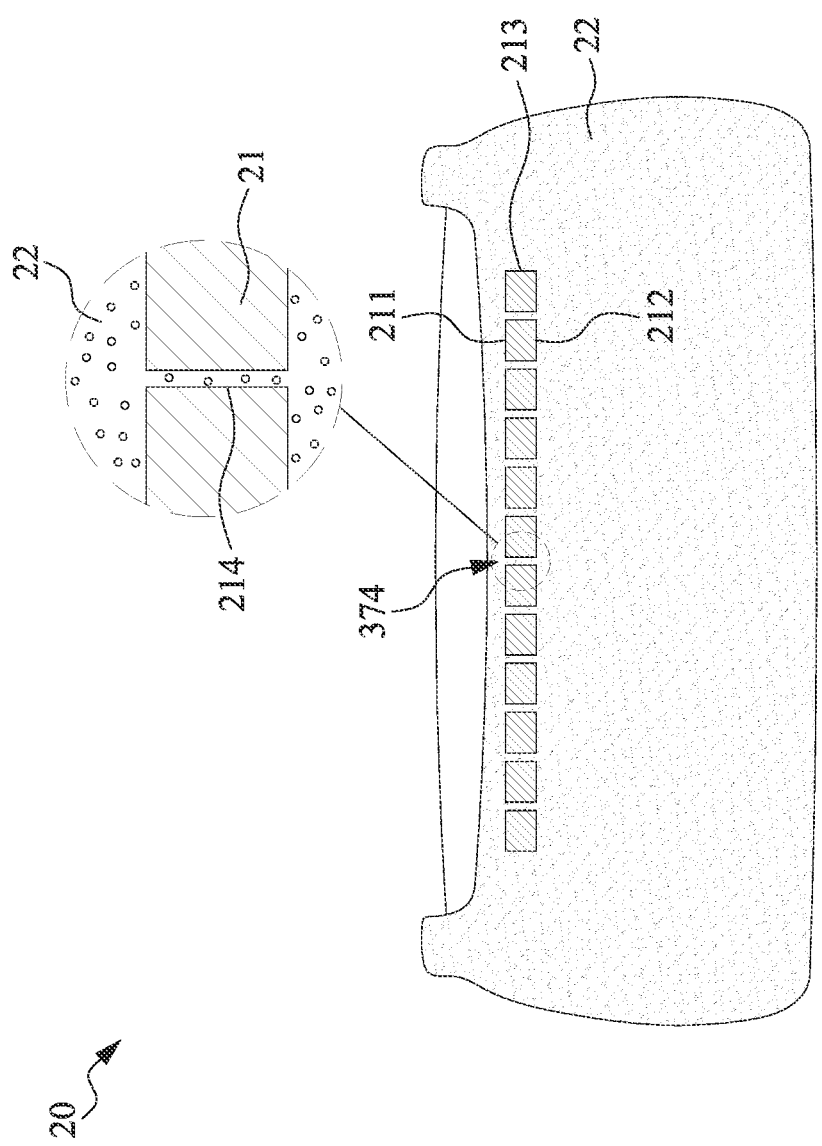
FIG. 3-6 are schematic cross-sectional views taken along a line II-II' in FIG. 1 and illustrating an exemplary article according to one embodiment of the present disclosure.
Figure 4:
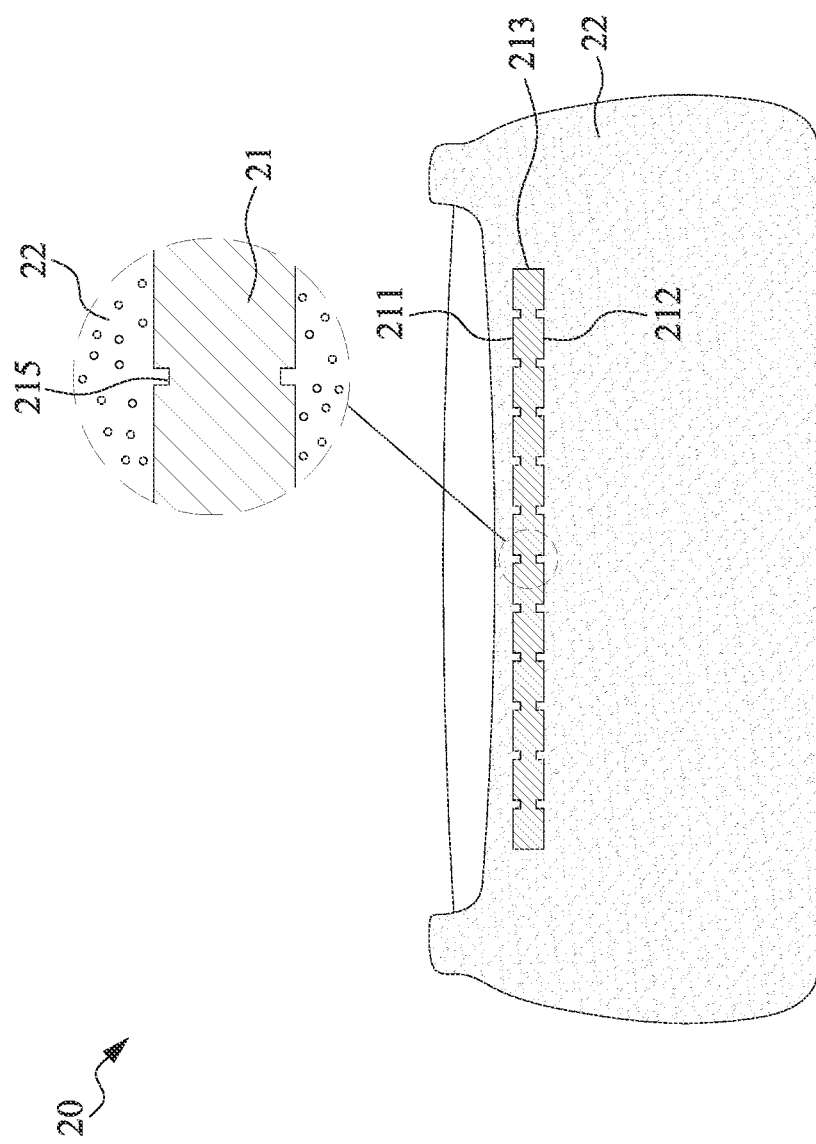
Figure 5:
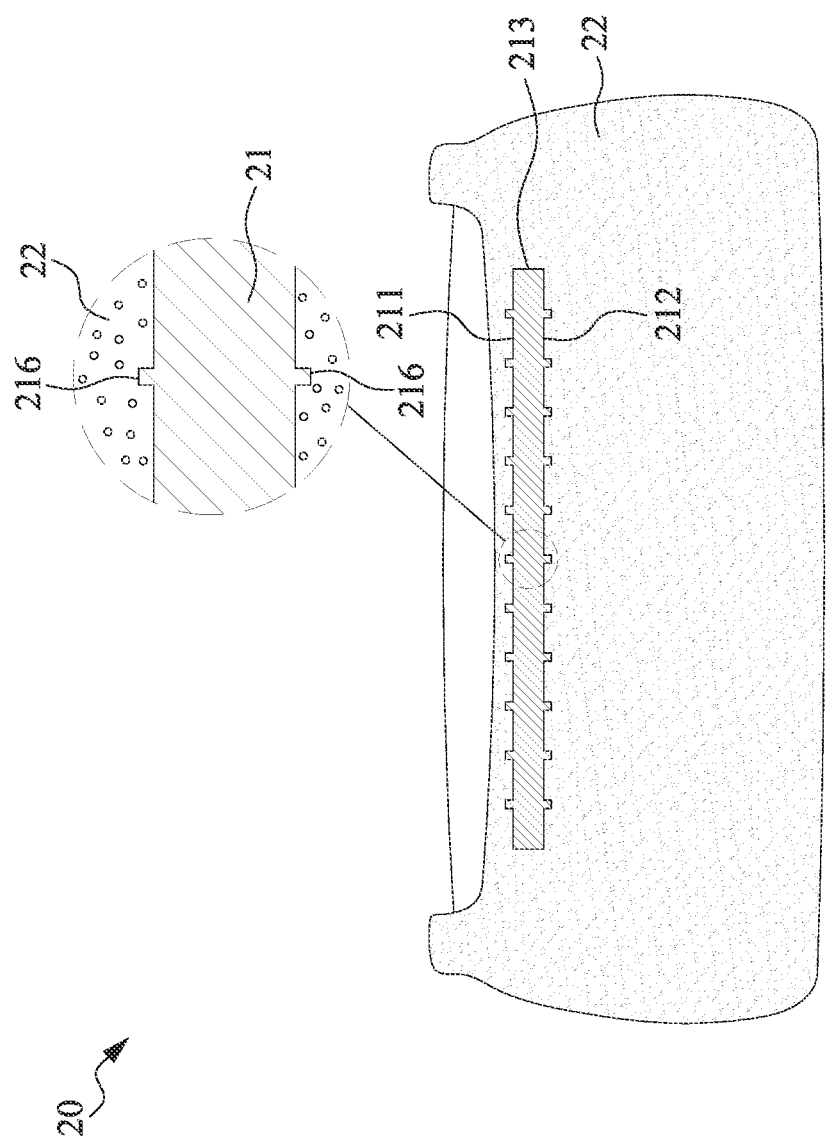

FIG. 1 illustrates a schematic view of an article according to one embodiment of the present disclosure. FIGS. 2 and 2A are schematic diagrams illustrating a core of the article according to one embodiment of the present disclosure. The core of the article can be in various configurations as shown in any of FIGS. 3 to 5. FIGS. 3 to 5 are schematic cross-sectional views taken along a line II-II' in FIG. 1 and illustrate various configuration of an article according to one embodiment of the present disclosure. Referring to FIGS. 1 and 2, an article 20 includes a foamed member 22 including a polymeric material and a core 21 embedded in the foamed member 22. The core 21 improves a strength of the article 20. The shape of the core 21 and the foamed member 22 may corresponding to each other, can be, but are not limited to, round, oval, rectangular, square or other desired shape from a top view. In some embodiments, the article 20 is a part of a footwear or a semi-product of a footwear. In some embodiments, the article 20 is an outsole of the footwear. In some embodiments, the article 20 is a midsole of the footwear. In some embodiments, a thickness of the article 20 is equal to or greater than 20 mm. In some embodiments, the thickness of the article 20 is equal to or greater than 25 mm.

In some embodiments, the foamed member 22 includes a polymeric material such as ethylene vinyl acetate (EVA), styrene-ethylene-butylene-styrene (SEBS), thermoplastic polyurethanes (TPU), thermoplastic polyester elastomer (TPEE) or the like. In some embodiments, the foamed member 22 includes a recyclable material. In some embodiments, a thickness of a periphery of the foamed member 22 is equal to or greater than 20 mm. In some embodiments, the thickness of the periphery of the foamed member 22 is equal to or greater than 25 mm. In some embodiments, the foamed member 22 further includes a blowing agent. In some embodiments, the blowing agent can be any type of chemical or physical blowing agent known to those of ordinary skill in the art. In some embodiments, the blowing agent is a supercritical fluid. The supercritical fluid may include inert gas such as carbon dioxide or nitrogen in supercritical state. In some embodiments, the foamed member 22 is made from a molding material including a polymeric material and a blowing agent. In some embodiments, the article 20 is free from adhesive.

In some embodiments, the core 21 includes a first surface 211, a second surface 212 opposite to the first surface 211, and a sidewall 213 between the first surface 211 and the second surface 212. In some embodiments, the foamed member 22 covers at least a portion of the first surface 211, and covers the entire sidewall 213 and the entire second surface 212. In some embodiments, the foamed member 22 contacts at least a portion of the first surface 211, and contacts the entire sidewall 213 and the entire second surface 212. In some embodiments, a portion of the first surface 211 is exposed through the foamed member 22. In some embodiments, a mark 374 is disposed at and indented into the foamed member 22. In some embodiments, a portion of the first surface 211 is exposed through the mark 374. In some embodiments, the mark 374 and the core 21 are overlapped from a top view.

In some embodiments, the article 20 is free of the mark 374, and the core 21 is enclosed by the foamed member 22. In some embodiments, the foamed member 22 contacts the entire first surface 211, the entire sidewall 213, and the entire second surface 212.

In some embodiments, the core 21 includes a polymeric material such as ethylene vinyl acetate (EVA), styrene-ethylene-butylene-styrene (SEBS), thermoplastic polyurethanes (TPU), thermoplastic polyester elastomer (TPEE) or the like. In some embodiments, the core 21 is a non-foamable piece. In some embodiments, the core 21 includes a recyclable material. Alternatively, in some embodiments, the core 21 is a foamed piece. In some embodiments, the foamed piece includes a polymeric material and a blowing agent. In some embodiments, a stiffness of the non-foamable piece is greater than a stiffness of the foamed piece. In some embodiments, the core 21 and the foamed member 22 include the same material.

In order to enhance the bonding strength between the core 21 and the foamed member 22, in some embodiments, a surface area of the core 21 is increased by forming a pattern on the first surface 211 and/or the second surface 212, and at least a portion of the foamed member 22 is conformal to the pattern. In some embodiments, the properties of the core 21 is affected by the pattern. The pattern may distribute across the core 21, and may not be limited to any particular type, as long as the properties of core 21 meet actual needs. In some embodiments, at least one of the first surface 211, the second surface 212, and the sidewall 213 is a roughened surface. In some embodiments, the core 21 has a Young's modulus ranging between 230 and 430 kg/mm$^2$.

In some embodiments, referring to FIG. 2A, the core 21 includes two or more pieces. In some embodiments, the core 21 includes a first layer 217 and a second layer 218 disposed over the first layer 217. Alternatively, the first 217 is disposed over the second layer 218 in some embodiments. In some embodiments, the first layer 217 attaches to the second layer 218. In some embodiments, the first layer 217 is a non-foamable piece, and the second layer 218 is a foamed piece. In some embodiments, the first layer 217 and the second layer 218 includes same or different materials. In some embodiments, the first layer 217 directly bonds to the second layer 218. In some embodiments, an adhesive is disposed between the first layer 217 and the second layer 218 to bond the first layer 217 with the second layer 218.

In some embodiments, referring to FIGS. 2 and 3, the pattern is a through hole 214 extending between the first surface 211 and the second surface 212. In some embodiments, a portion of the foamed member 22 is disposed within the through hole 214. In some embodiments, a plurality of the through holes 214 are extending between the first surface 211 and the second surface 212. In some embodiments, the through holes 214 are disposed throughout the core 21. In some embodiments, a density, sizes and the shapes of the through holes 214 are not limited as long as the properties of the core 21 meet the actual needs.

In some embodiments, referring to FIGS. 2 and 4, the pattern is a recess 215 indented into the core 21 and disposed at the first surface 211. In some embodiments, a portion of the foamed member 22 is disposed within the recess 215. In some embodiments, a plurality of recesses 215 are disposed at the first surface 211, the second surface 212 and/or the sidewall 213 of the core 21. In some embodiments, a density, sizes, depths and the shapes of the recesses 215 are not limited as long as the properties of the core 21 meet the actual needs.

In some embodiments, referring to FIGS. 2 and 5, the pattern is protrusion 216 protruded from the first surface 211. In some embodiments, the foamed member 22 surrounds the protrusion 216. In some embodiments, a plurality of protrusions 216 are disposed at the first surface 211, the second surface 212 and/or the sidewall 213 of the core 21. In some embodiments, a density, sizes, heights and the shapes of the protrusions 216 are not limited as long as the properties of the core 21 meet the actual needs.

Figure 6:
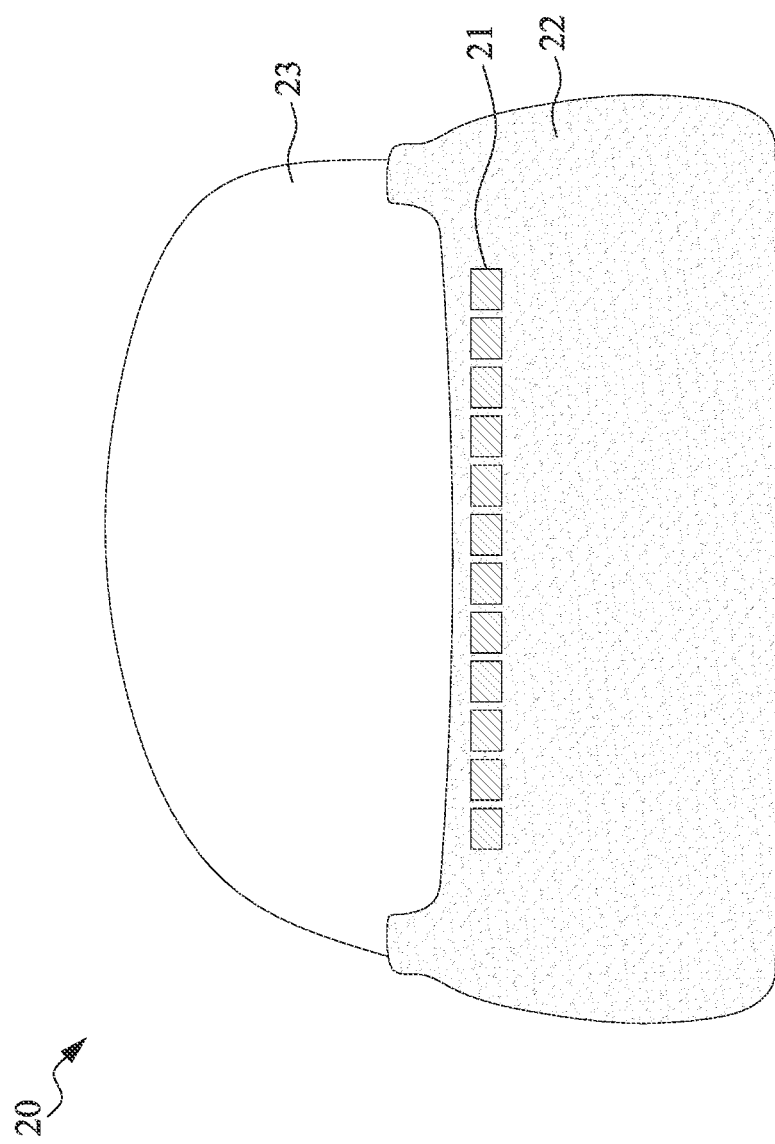

FIG. 6 is a schematic cross-sectional view of an article in accordance with some embodiments of the present disclosure. In some embodiments, referring to FIG. 6, a component 23 is disposed over the core 21 and the foamed member 22. In some embodiments, the component 23 is attached to and disposed over the foamed member 22. In some embodiments, a portion of the foamed member 22 is disposed between the component 23 and the core 21, so that the core 21 is not in contact with the component 23. In some embodiments, the component 23 is adjacent to the core 21. In some embodiments, the first surface 211 of the core 21 faces the component 23. In some embodiments, the component 23 is an insole, a footwear upper or any other suitable component of the footwear.

Figure 7:
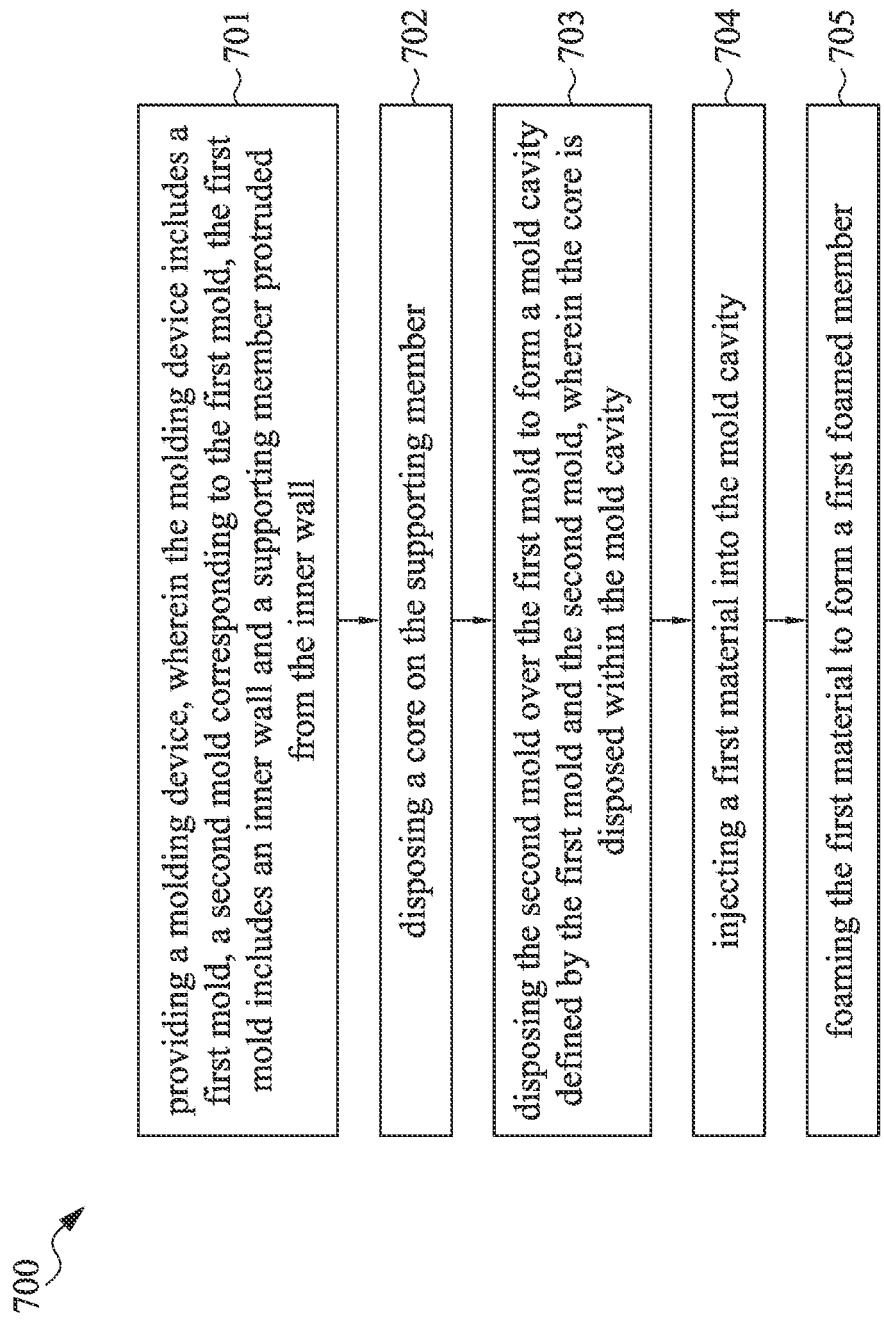
FIG. 7 is a flowchart illustrating a method of manufacturing an article according to one embodiment of the present invention.

FIG. 7 is a flowchart showing a method 700 of manufacturing an article in accordance with some embodiments of the present disclosure. The method 700 includes several operations: (701) providing a molding device, wherein the molding device includes a first mold, a second mold corresponding to the first mold, the first mold includes an inner wall and a supporting member protruded from the inner wall; (702) disposing a core on the supporting member; (703) disposing the second mold over the first mold to form a mold cavity defined by the first mold and the second mold, wherein the core is disposed within the mold cavity; (704) injecting a first material into the mold cavity; and (705) foaming the first material to form a first foamed member, wherein at least a portion of the first foamed member is in contact with the core.

In order to illustrate concepts and the method 700 of the present disclosure, various embodiments are provided below. However, the present disclosure is not intended to be limited to specific embodiments. In addition, elements, conditions or parameters illustrated in different embodiments can be combined or modified to form different combinations of embodiments as long as the elements, parameters or conditions used are not in conflict. For ease of illustration, reference numerals with similar or same functions and properties are repeated in different embodiments and figures. The various operations and the thus formed articles of the injection molding method can be in various configurations as shown in any of FIGS. 8, 13, 14 and 17 to 21. FIG. 22 is a schematic cross-sectional view illustrating an article 20 manufactured by the method 700 in accordance with some embodiments of the present disclosure.

Figure 8:
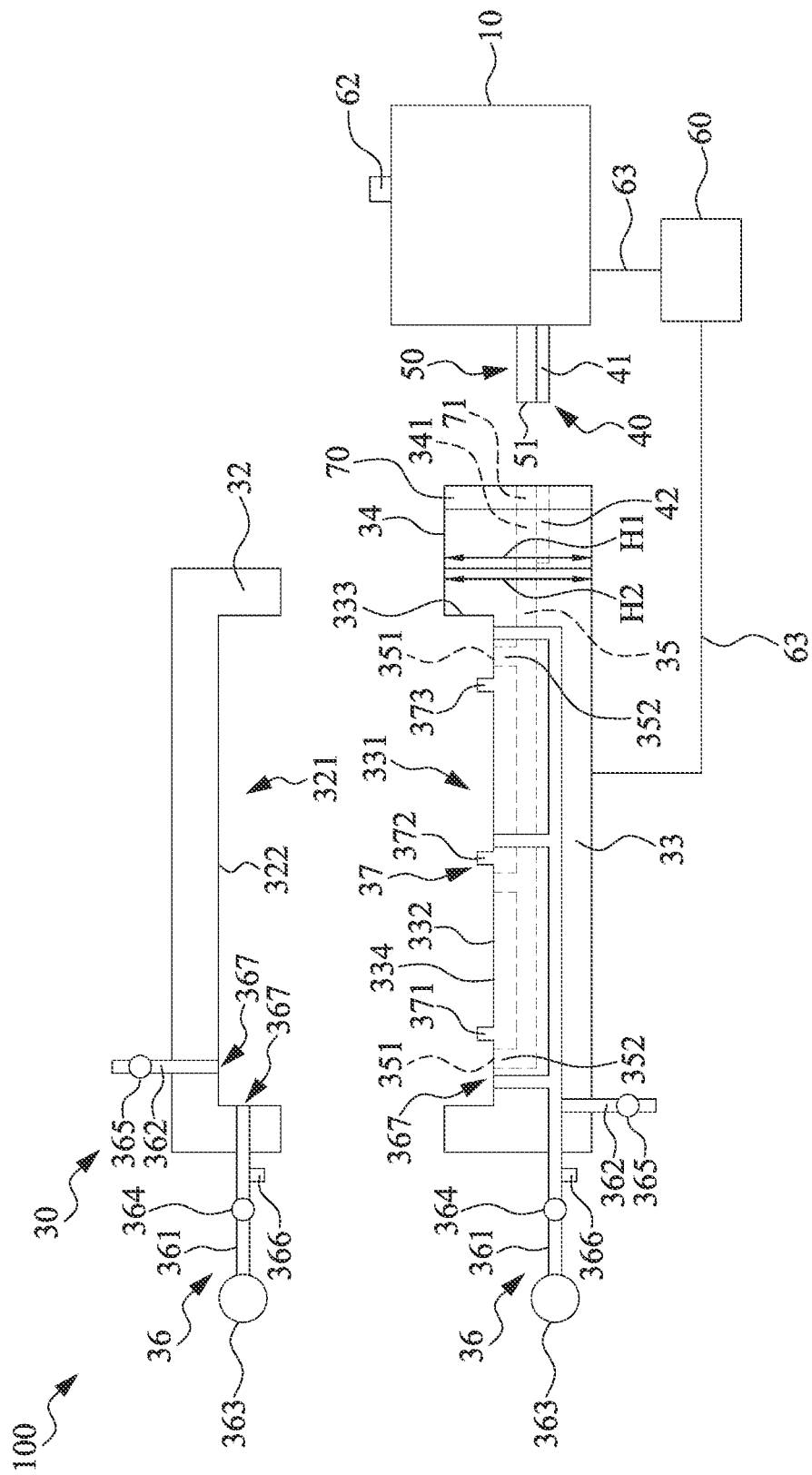
FIGS. 8, 13, 14, 17 to 21 are schematic cross-sectional views illustrating exemplary operations in a method of manufacturing an article according to one embodiment of the present disclosure.
Figure 9:
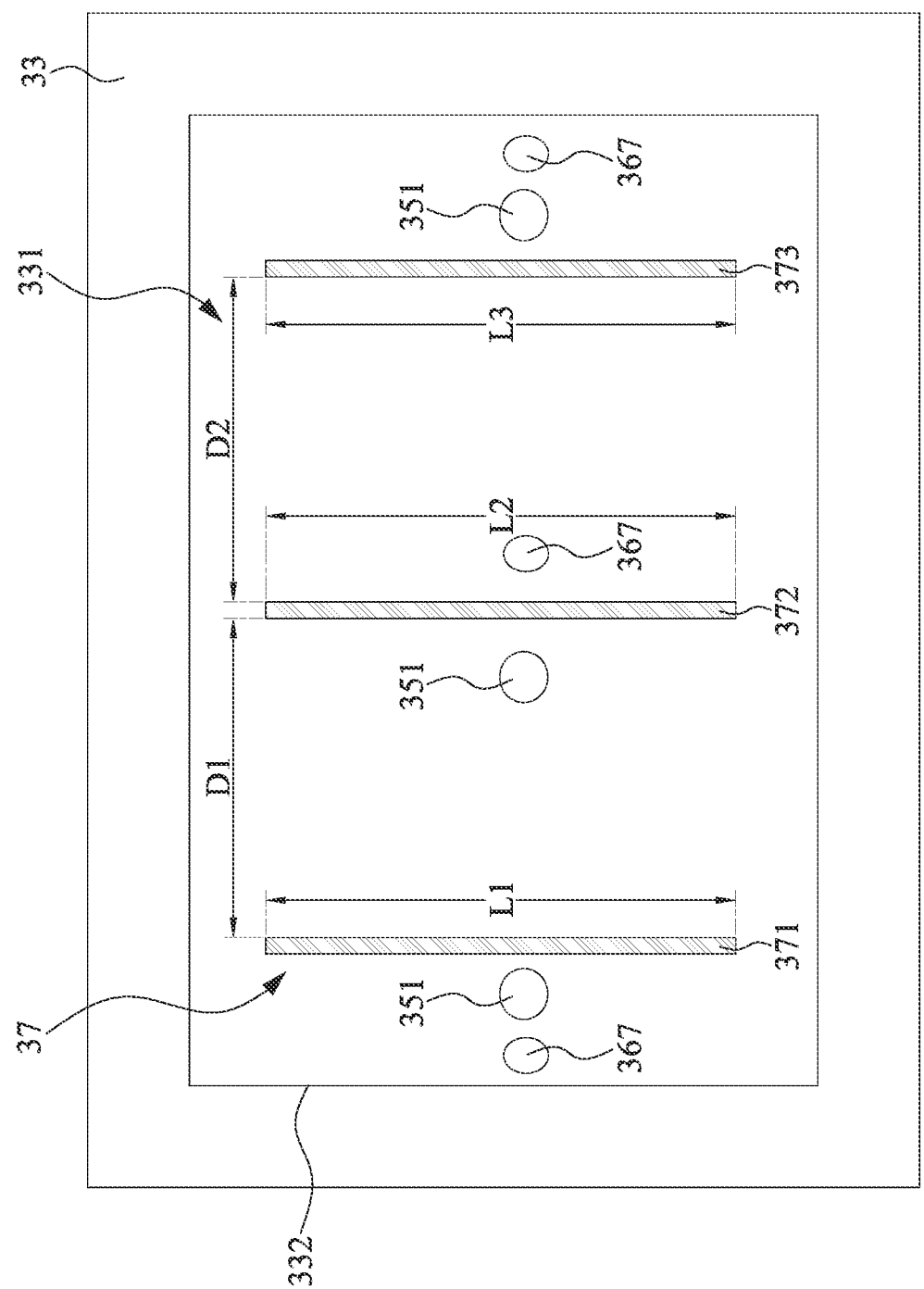
FIGS. 9 to 12 are schematic top views of a portion of an injection molding system used in a method of manufacturing an article in accordance with some embodiments of the present disclosure.

In some embodiments, an injection-molding system 100 of the operation 701 of the method 700 in accordance with some embodiments of the present disclosure is illustrated in FIG. 8. In some embodiments, the method 700 of manufacturing an article 20 includes operation 701, which includes providing a molding device 30, wherein the molding device 30 includes a first mold 33, a second mold 32 corresponding to the first mold 33. In some embodiments, the first mold 33 is a lower mold, and the second mold 32 is an upper mold. In some embodiments, the molding device 30 includes a mold base 34 adjacent to the first mold 33 and the second mold 32. In some embodiments, the mold base 34 attaches to the first mold 33. In some embodiments, the molding device 30 is provided or received as shown in FIG. 8. In some embodiments, the molding device 30 is configured to forming the article 20.

In some embodiments, the first mold 33 and the second mold 32 are separated from each other during operation 701. In some embodiments, the first mold 33 and the second mold 32 are complementary with and separable from each other. In some embodiments, the first mold 33 and the second mold 32 are complementary with each other in order to define a mold cavity (not shown).

In some embodiments, the first mold 33 defines a lower mold cavity 331 and the second mold 32 defines an upper mold cavity 321. In some embodiments, the first mold 33 includes an inner wall 332 and a supporting member 37 protruded from the inner wall 332. In some embodiments, the inner wall 332 of the first mold 33 is curved.

In some embodiments, at least one feeding port 35 is disposed at the molding device 30. In some embodiments, the feeding port 35 is disposed at the first mold 33 or the second mold 32. In some embodiments, the feeding port 35 is communicable with the upper mold cavity 321 or the lower mold cavity 331. FIG. 8 illustrates only one feeding ports 35 is included in one mold for clarity and simplicity, but such example is intended to be illustrative only, and is not intended to be limiting to the embodiments. A person ordinarily skilled in the art would readily understand that one mold may include one or more feeding port 35 communicable with the upper mold cavity 321 or the lower mold cavity 331.

The feeding port 35 is configured to receive a molding material (not shown) into the upper mold cavity 321 and/or the lower mold cavity 331. In some embodiments, several feeding ports 35 are disposed at the molding device 30. The molding material can be transported into the molding device 30 through the feeding port 35. In some embodiments, the molding material is injected into the upper mold cavity 321 and the lower mold cavity 331 and then the foamed member 22 is formed in the upper mold cavity 321 and the lower mold cavity 331 after a period of time. In some embodiments, the feeding port 35 is disposed at the first mold 33. In some embodiments, the feeding port 35 can be configured at a sidewall of the first mold 33 or any other suitable positions as long as the feeding port 35 is communicable with the lower mold cavity 331. In some embodiments, instead of configuring the feeding port 35 at the first mold 33, the first feeding port 35 can be configured at the second mold 32 for accessing the upper mold cavity 321.

In some embodiments, a feeding opening 351 is in connection with the feeding port 35. In some embodiments, the feeding opening 351 is configured to transport the molding material from the feeding port into the molding device 30. In some embodiments, the feeding opening 351 is disposed at the inner wall 332 of the first mold 33 and configured to transport the molding material from the feeding port 35 into the lower mold cavity 331. In some embodiments, the feeding opening 351 is disposed at the inner sidewall 333 of the first mold 33. In some embodiments, the feeding opening 351 is disposed at the inner bottom wall 334 of the first mold 33. In some embodiments, the feeding opening 351 is disposed at the inner wall 322 of the second mold 32. In some embodiments, the feeding opening 351 is disposed adjacent to and separated from the supporting member 37. In some embodiments, the feeding port 35 is in communication with a plurality of feeding openings 351. In some embodiments, the plurality of the feeding openings 351 are respectively connected with the feeding port 35. In some embodiments, the feeding openings 351 can have different widths or diameters. The locations of the feeding openings 351 are not particularly limited, they can be disposed at different regions of the inner wall 332 of the first mold 33 and the inner wall 322 of the second mold 32. In some embodiments, an end at which the feeding port 35 connects with the upper mold cavity 321 and/or the lower mold cavity 331 have a plurality of guiding channels 352, wherein each guiding channel 352 is connected to a corresponding feeding opening 351 and the feeding port 35.

In some embodiments, the mold base 34 includes openings 341. Each of the openings 341 extends through the mold base 34. The mold base 34 may be mounted on the first mold 33 or the second mold 32 by a screw, a clamp, a fastening means or the like. In some embodiments, the material of the mold base 34 is same as the material of the first mold 33. In some embodiments, a height H1 of the mold base 34 is greater than or equal to a height H2 of the first mold 33 or the second mold 32.

In some embodiments, the molding devices 30 further includes one or more pressure-regulating systems 36. In some embodiments, and a junction point 367 is in connection with the lower mold cavity 331 and/or the upper mold cavity 321. In some embodiments, a plurality of junction points 367 are in connection with the upper mold cavity 321 and the lower mold cavity 331. In some embodiments, the junction points 367 are configured to allow a fluid or gas to enter into or exit from the molding device 30. The location, shape and number of the junction points 367 are not particularly limited, and may be adjusted depending on the needs. In some embodiments, each of the junction points 367 is a hole.

The pressure-regulating system 36 may include a first gas conduit 361, a second gas conduit 362, a gas source 363, a first valve 364, a second valve 365, and a pressure-sensing unit 366. In some embodiments, one end of the first gas conduit 361 is coupled to the junction point 367, and the other end of the first gas conduit 361 is coupled to the gas source 363. In some embodiments, the gas source 363 is configured to supply a fluid or gas, in which a suitable fluid or gas may be supplied depending on the needs; for example, the fluid or gas may be air, inert gas, etc., but the present invention is not limited thereto. In some embodiments, one end of the first gas conduit 361 is coupled to the junction point 367.

In some embodiments, the junction points 367 are configured to supply gas or discharge gas. The first valve 364 is disposed at the first gas conduit 361 and is configured to control whether the gas from the gas source 363 enters the lower mold cavity 331 and/or the upper mold cavity 321 through the first gas conduit 361 and the junction point 367. In some embodiments, when the first valve 364 is open and the second valve 365 is closed, the fluid or gas is supplied to the lower mold cavity 331 and/or the upper mold cavity 321; when the first valve 364 is closed and the second valve 365 is open, at least a portion of the fluid or gas in the lower mold cavity 331 and/or the upper mold cavity 321 is discharged.

In some embodiments, the second gas conduit 362 is coupled to the junction point 367. The second valve 365 is disposed at the second gas conduit 362 and is configured to control whether the gas from the lower mold cavity 331 or the upper mold cavity 321 is discharged valve the junction point 367 through the second gas conduit 362. In some embodiments, the second gas conduit 362 is coupled to the junction point 367.

In some embodiments, one end of the second gas conduit 362 is in communication with a space with a pressure lower than the pressure in the lower mold cavity 331 or the upper mold cavity 321; for example, an external environment or a negative pressure space; however, the present invention is not limited thereto. In some embodiments, the first valve 364 and the second valve 365 are not simultaneously open.

The pressure-sensing unit 366 is configured to sense the pressure in the lower mold cavity 331 or the upper mold cavity 321. The pressure-sensing; unit 366 is not limited to any particular type, as long as it can sense the pressure and provide pressure information after sensing the pressure in the lower mold cavity 331 or the upper mold cavity 321. The pressure-regulating system 36 changes the condition at which the gas exits from/enters into the lower mold cavity 331 or the upper mold cavity 321 in accordance with the pressure information, so as to adjust the pressure in the lower mold cavity 331 or the upper mold cavity 321, in such a manner that the composite thus obtained has the desired predetermined shape and property.

In some embodiments, the pressure-sensing unit 366 is disposed in the lower mold cavity, the upper mold cavity 321, the first gas conduit 361 or the second gas conduit 362. In some embodiments, the pressure-sensing unit 366 is disposed in the lower mold cavity 331 and the upper mold cavity 321 and is away from the feeding openings 351. In some embodiments, the pressure-regulating system 36 has a plurality of pressure-sensing units 366. The number and location of the plurality of pressure-sensing units 366 are not particularly limited, for example, they can be arranged at the inner wall 322 of the first mold 33 and the inner wall 332 of the second mold 32 and spaced from each other, and/or anywhere in the first gas conduit 361, and/or anywhere in the second gas conduit 362; however, the present invention is not limited thereto.

In some embodiments, the supporting member 37 is configure to support the core 21 and prevent the core 21 from in contact with the inner wall 332 of the first mold 33. The core 21 may dispose on the supporting member 37, and the molding material subsequently filled into the molding device 30 may in contact with the first surface 211, the second surface 212 and the sidewall 213 of the core 21. In some embodiments, a surface area of a top surface of the supporting-member 37 is smaller than that of the first surface 211 of the core 21. In some embodiments, the supporting member 37 and the feeding openings 351 are disposed at the inner wall 332 of the first mold 33. The supporting member 37, the feeding openings 351 and the junction points 367 are separated from each other.

In some embodiments, the supporting member 37 includes a plurality of supporting units 371, 372, 373 protruded from the inner wall 332. The supporting units 371, 372, 373 are separated from each other. The locations and number of the supporting units 371, 372, 373 are not particularly limited, and may be adjusted depending on the needs, such as disposed them at different regions of the inner wall 332 of the first mold 33. In some embodiments, the supporting units 371, 372, 373 are disposed at and protruded from the inner bottom wall 334 of the first mold 33. In some embodiments, at least two of the supporting unit 371, 372, 373 are disposed at the opposite sides of the inner wall 332 of the first mold 33. In some embodiments, the number of the junction points 367 is greater than the number of the supporting units 371, 372, 373. The heights of each of the supporting units 371, 372, 373 may be same or different, as long as the core 21 may be disposed on the supporting units 371, 372, 373. In some embodiments, the heights of each of the supporting units 371, 372, 373 are the same.

In some embodiments, each of the supporting units 371, 372, 373 are disposed adjacent to the corresponding feeding openings 351 from a cross-section view. In some embodiments, each of the supporting units 371, 372, 373 are disposed adjacent to the corresponding junction points 367 from a cross-section view. In some embodiments, one of the supporting units 371, 372, 373 is disposed between the corresponding feeding opening 351 and the corresponding junction point 367. In some embodiments, one of the supporting units 371, 372, 373 is disposed adjacent to the corresponding feeding opening 351 and the corresponding junction point 367. In some embodiments, one of the feeding opening 351 is disposed between the corresponding junction point 367 and the corresponding supporting unit 371.

In some embodiments, in order to maintain the temperature difference between the discharging channel 50 and the molding device 30, the injection molding system 100 further includes an insulator 70 disposed between the discharging channel 50 and the molding device 30. In some embodiments, the insulator 70 is disposed between the discharging channel 50 and the mold base 34. In some embodiments, the insulator 70 is disposed on the mold base 34. In some embodiments, the insulator 70 is disposed between the outlet 51 and the feeding port 35.

The discharging channel 50 may extend into the insulator 70 and is thereby partially surrounded by the insulator 70. In some embodiments, the insulator 70 includes openings 71 configured to receive the discharging channel 50. The openings 71 of the insulator 70 are aligned to the openings 341 of the mold base 34 and the feeding port 35. The openings 71 extends through the insulator 70. The insulator 70 may be mounted on the mold base 34, such as by a screw. The insulator 70 may include a non-thermally conductive material, such as a fiber glass. The insulator 70 may be comprised entirely of non-metal materials. In some embodiments, the insulator 70 has a melting point substantially greater a temperature of the mixture flowing through the discharging channel 50. In some embodiments, the melting point of the insulator 70 is substantially greater than 180° C.

FIGS. 9 to 12 are schematic top views of a portion of an injection molding system 100 of the operation 701 of the method 700 in accordance with some embodiments of the present disclosure. The size and shape of each of the portion may be same as or different from each other, may be, but are not limited to, round, oval, rectangular, square, curved, strip or other desired shape from a top view. In some embodiments, referring to FIG. 9, shapes of the supporting units 371, 372, 373 are similar to each other. In some embodiments, each of the supporting units 371, 372, 373 is a strip from a top view. Further, a distance D1 between the supporting unit 371 and the support unit 372 and a distance D2 between supporting unit 372 and the support unit 373 may be same or different. In some embodiments, the distance D1 is equal to the distance D2. In some embodiments, the distance D1 is different from the distance D2. A length L1 of the supporting unit 371, a length L2 of the supporting unit 372, and a length L3 of the supporting unit 373 may be same or different from each other. The lengths L1, L2, L3 are not limited, as long as the core 21 may dispose on the support member 37.

Figure 10:
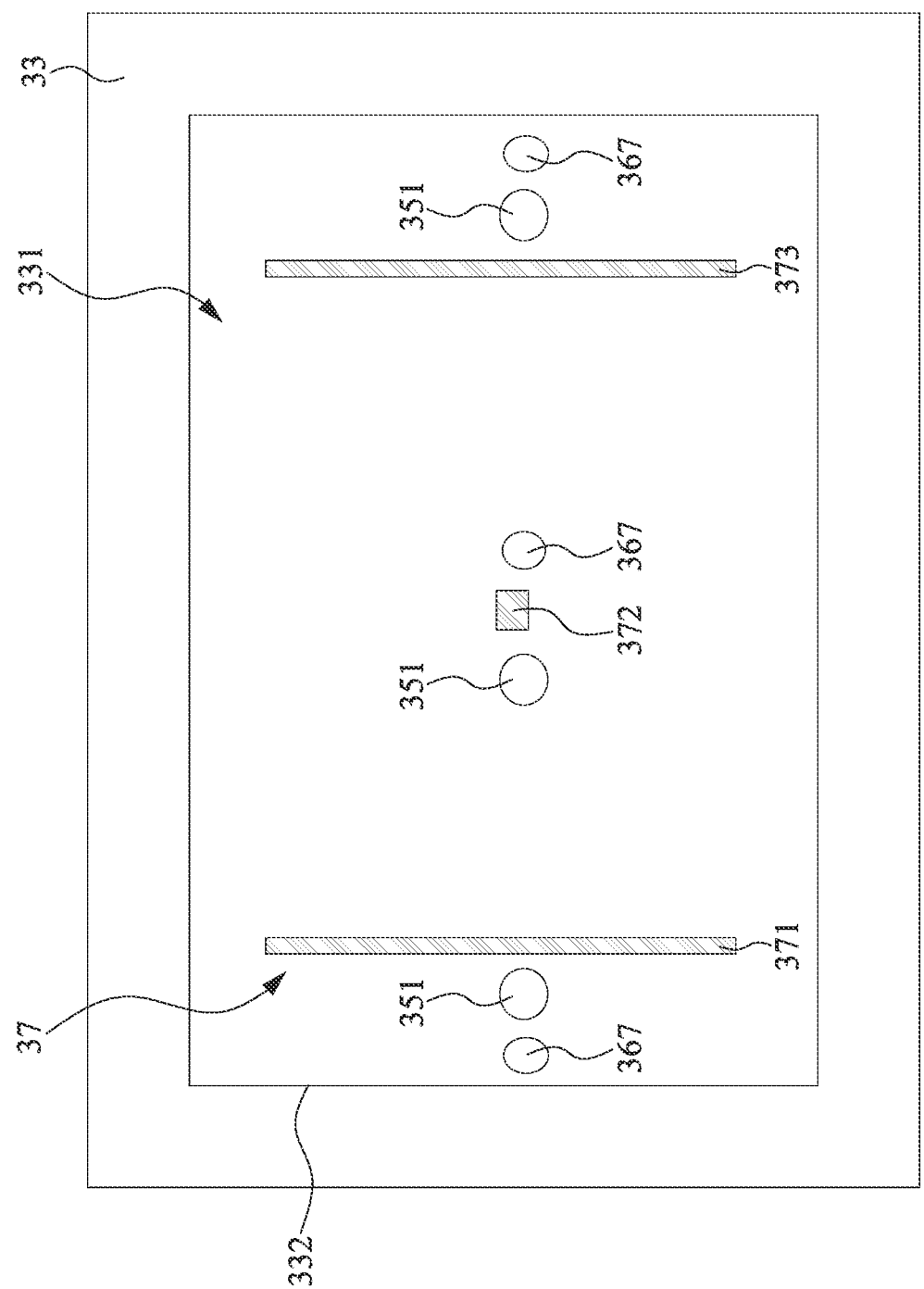
Figure 11:
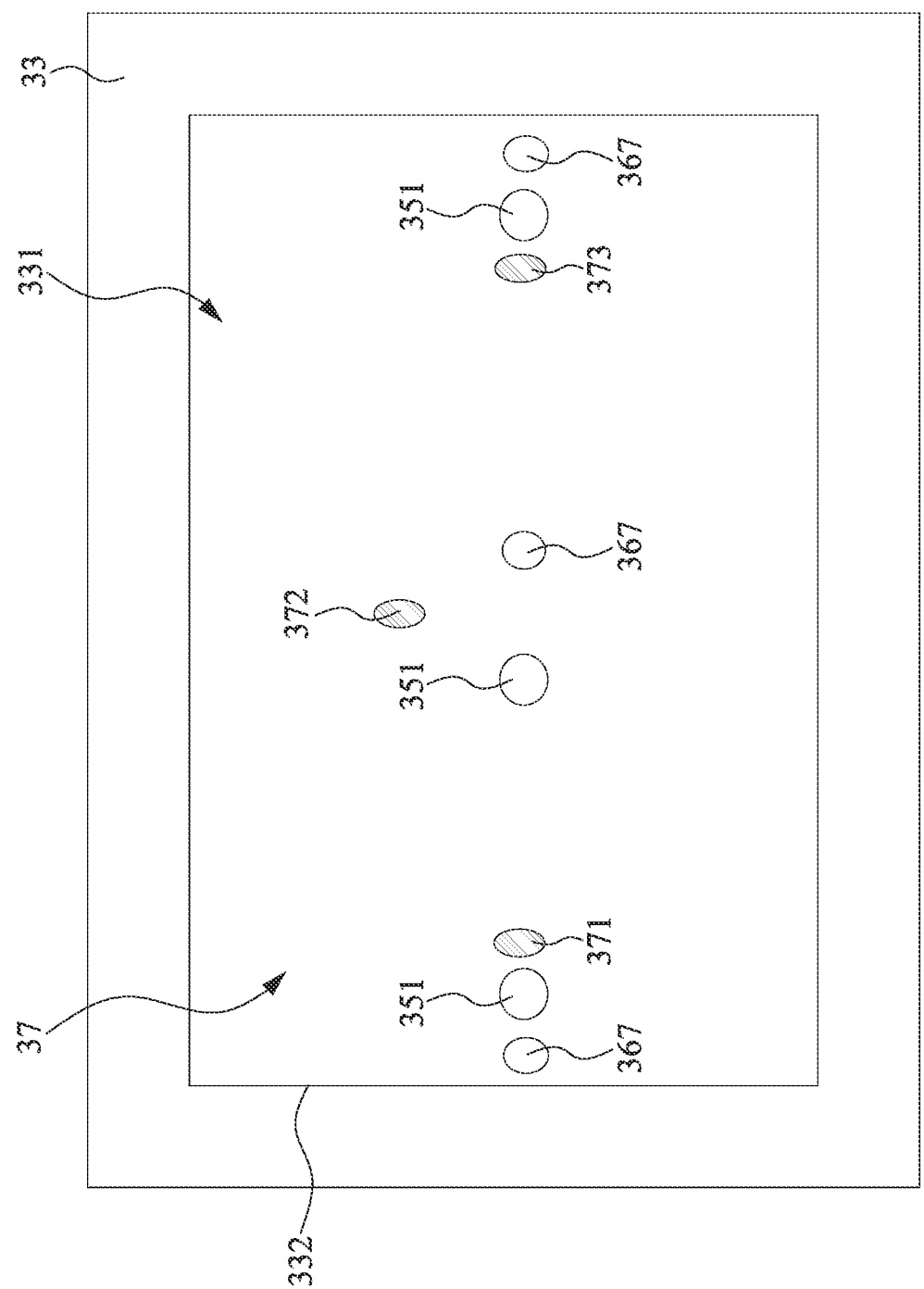
Figure 12:
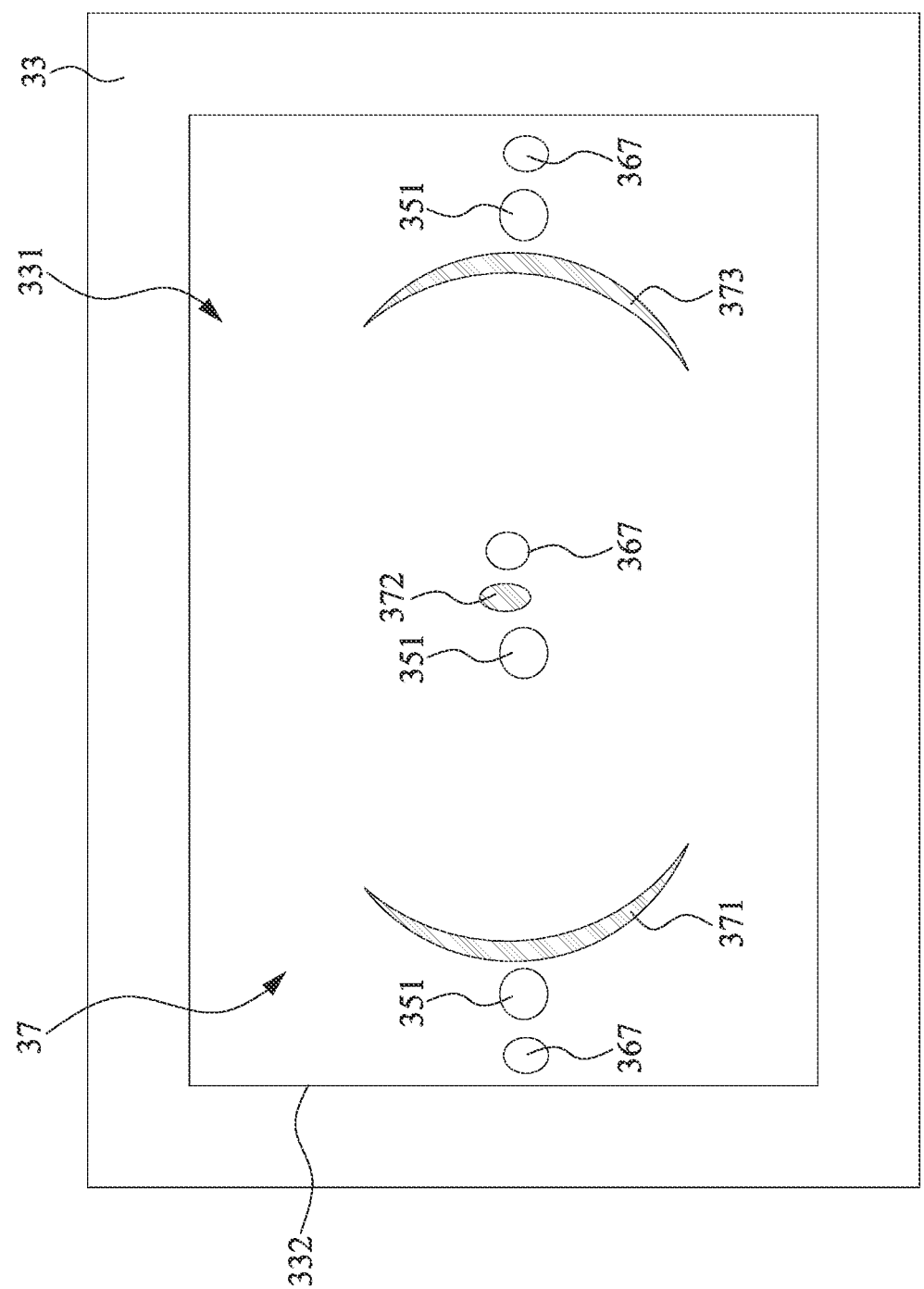
Figure 13:
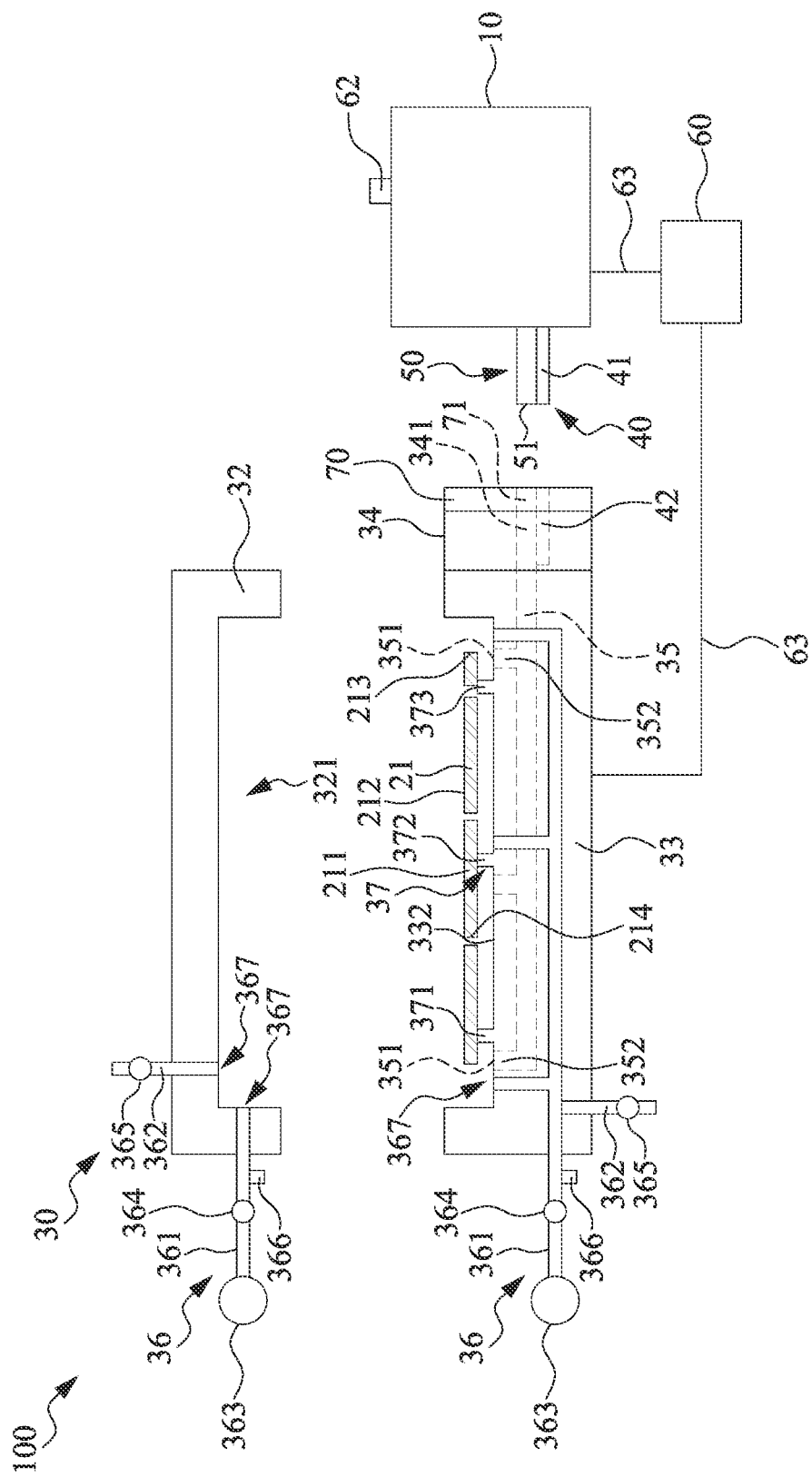

In some embodiments, referring to FIG. 10, shapes of the supporting units 371, 372, 373 are different. Is some embodiments, the supporting unit 372 is disposed between the supporting unit 371 and supporting unit 373. The shape of the supporting unit 371 is similar to that of the supporting unit 373, and the shape of the supporting unit 372 is different from that of the supporting unit 371. In some embodiments, the supporting units 371, 372, 373 are arranged in a row. In some embodiments, referring to FIG. 11, the supporting units 371, 372, 373 are arranged in an arc. In some embodiments, referring to FIG. 12, at least one of the supporting units 371, 372, 373 is in a shape of a curved. In some embodiments, at least one of the feeding openings 351 and one of the junction points 367 are disposed between the supporting unit 371 and the supporting unit 373.

In some embodiments, the method 700 further includes providing an extruding system 10 configured to produce a molding material (not shown), and providing a discharging channel 50 communicable with the extruding system 10 and including an outlet 51 disposed distal to the extruding system 10 and configured to discharge the molding material. In some embodiments, the feeding port 35 of the molding device 30 is correspondingly engageable with the outlet 51.

In some embodiments, the extruding system 10 and the discharging channel 50 are disposed adjacent to the feeding port 35 of the molding device 30. The molding device 30 is configured to receive the molding material from the outlet 51 of the discharging channel 50.

In some embodiments, the method 700 of manufacturing an article includes operation 702, which includes disposing a core 21 on the supporting member 37. In some embodiments, referring to FIG. 13, the core 21 is disposed on the supporting units 371, 372, 373. In some embodiments, the core 21 is disposed is the lower mold cavity 331. In some embodiments, the first surface 211 of the core 21 is in contact with the supporting unit 37. In some embodiments, the supporting unit 37 is disposed between the core 21 and the inner wall 332 of the first mold 33. Due to the supporting unit 37, the core 21 disposed within the molding device 30 may not cover the feeding opening 351 and the junction point 367.

In some embodiments, referring back to FIGS. 2A and 13, operation 702 includes disposing a first layer 217 of the core 21 over the supporting member 37, and disposing a second layer 218 of the core 21 over the first layer 217. In some embodiments, the method 700 includes disposing the first layer 217 and the second layer 218 into the molding device 30 one by one. In some embodiments, the second layer 218 attaches to the first layer 217. In some embodiments, the method 700 includes bonding the first layer 217 to the second layer 218, and disposing the first layer 217 and the second layer 218 into the molding device 30 at the same time.

In some embodiments, the method 700 of manufacturing an article includes operation 703, which includes disposing the second mold 32 over the first mold 33 to form a mold cavity 31 defined by the first mold 33 and the second mold 32, wherein the core 21 is disposed within the mold cavity 31. In some embodiments, referring to FIG. 14, the molding device 30 is in a closed configuration. In some embodiments, the mold cavity 31 is formed when the molding device 30 is in the closed configuration. In some embodiments, the first mold 33 is tightly engaged with the second mold 32 when the molding device 30 is closed.

In some embodiments, the method 700 includes engaging the outlet 51 with the feeding port 35 of the molding device 30.

In some embodiments, at the beginning of operations 701 to 702, referring back to FIGS. 8 and 13, the extruding system 10 and the discharging channel 50 are away from the molding device 30. In some embodiments, before the engagement of the outlet 51 with the feeding port 35 of the molding device 30, the discharging channel 50 are moved to a first position adjacent to the molding device 30. In some embodiments, the discharging channels 50 are moved to the first position adjacent to the molding device 30. At the first position, the discharging channel 50 are aligned with the opening 341 of the mold base 34 of the molding device 30. In some embodiments, a distance between the outlet 51 and the outer surface of the mold base 34 is greater than 0. In some embodiments, at the first position, the discharging channel 50 is aligned with the opening 71 of the insulator 70 and the opening 341 of the mold base 34.

Figure 14:
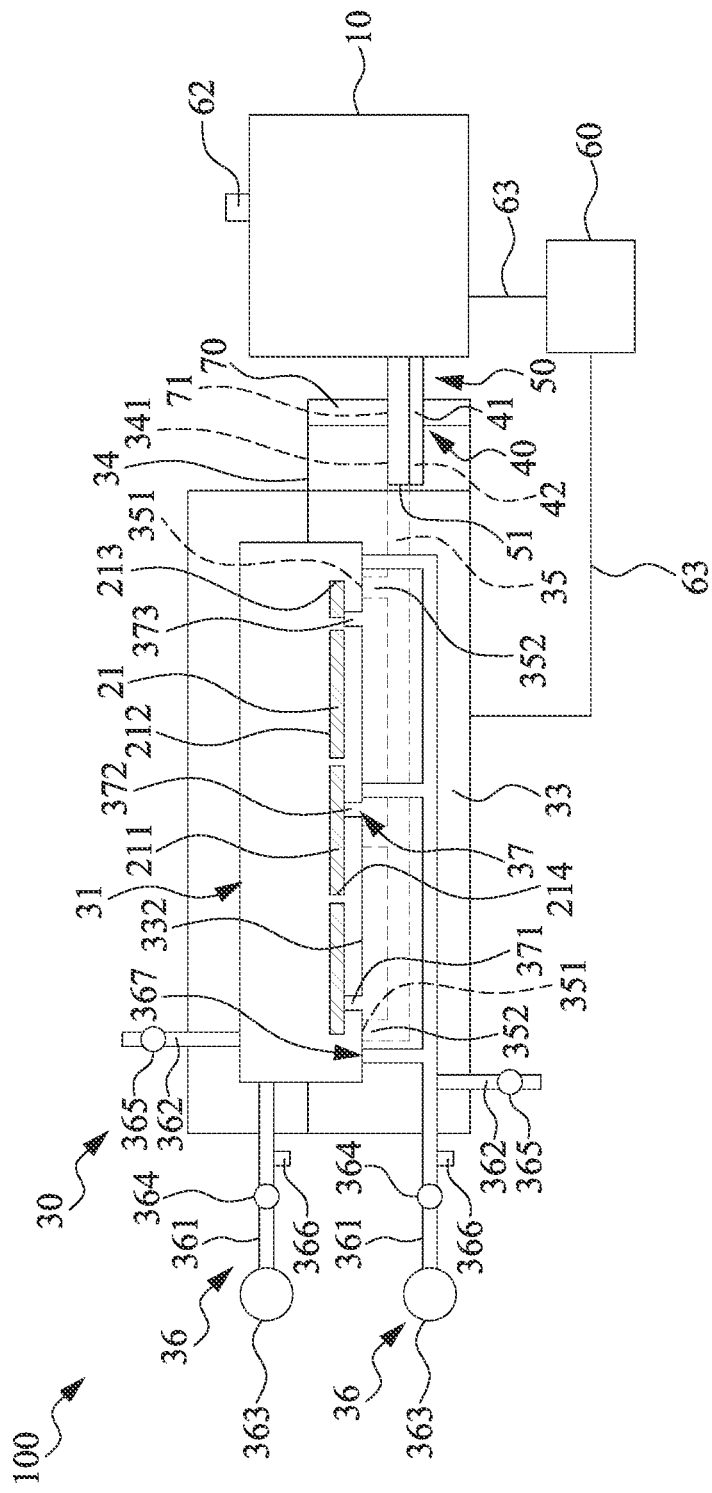

In some embodiments, referring to FIG. 14, after the alignment of the discharging channel 50 with the openings 341, the discharging channel 50 are moved toward the molding device 30 to be received by the openings 341 of the mold base 34, and then the outlet 51 is docked to the feeding ports 35. In some embodiments, the discharging channel 50 is moved toward the molding device 30 to be received by the openings 341 of the mold base 34. In some embodiments, the discharging channel 50 is moved toward the molding device 30 to be received by the opening 71 of the insulator 70 and the openings 341 of the mold base 34.

After the outlets 51 are docked to the feeding ports 35, the outlet 51 and the feeding port 35 form flow paths of the molding material, such that the discharging channel 50 is communicable with the mold cavity 31 through the feeding port 35. The outlets 51 must be tightly engaged with the feeding port 35 in order to prevent the molding material from leaking out of the molding device 30.

In some embodiments, the method 700 includes securing the discharging channel 50 to the molding device 30. In some embodiments, a force is provided by a support device 40 to prevent the separation of the extruding system 10 from the molding device 30.

In some embodiments, when the extruding system 10 injects molding material into the molding device 30, the molding device 30 may generate a reaction force opposite to an injection direction, and the reaction force may be transmitted to the discharging channel 50 and the extruding system 10, so that the discharging channel 50 tend to separate from the molding device 30. In some embodiments, the supporting device 40 provides support against the reaction force opposite to the injection direction.

In some embodiments, the discharging channel 50 is secured to the molding device 30 by engaging a first element 41 of the supporting device 40 relative to a second element 42 of the supporting device 40 to secure the discharging channel 50 with the molding device 30, wherein the first element 41 protrudes from the extruding system 10, and the second element 42 is disposed on the molding device 30. In some embodiments, a force is provided by the supporting device 40 after the engagement to prevent the discharging channel 50 separating from the molding device 30.

Figure 15:
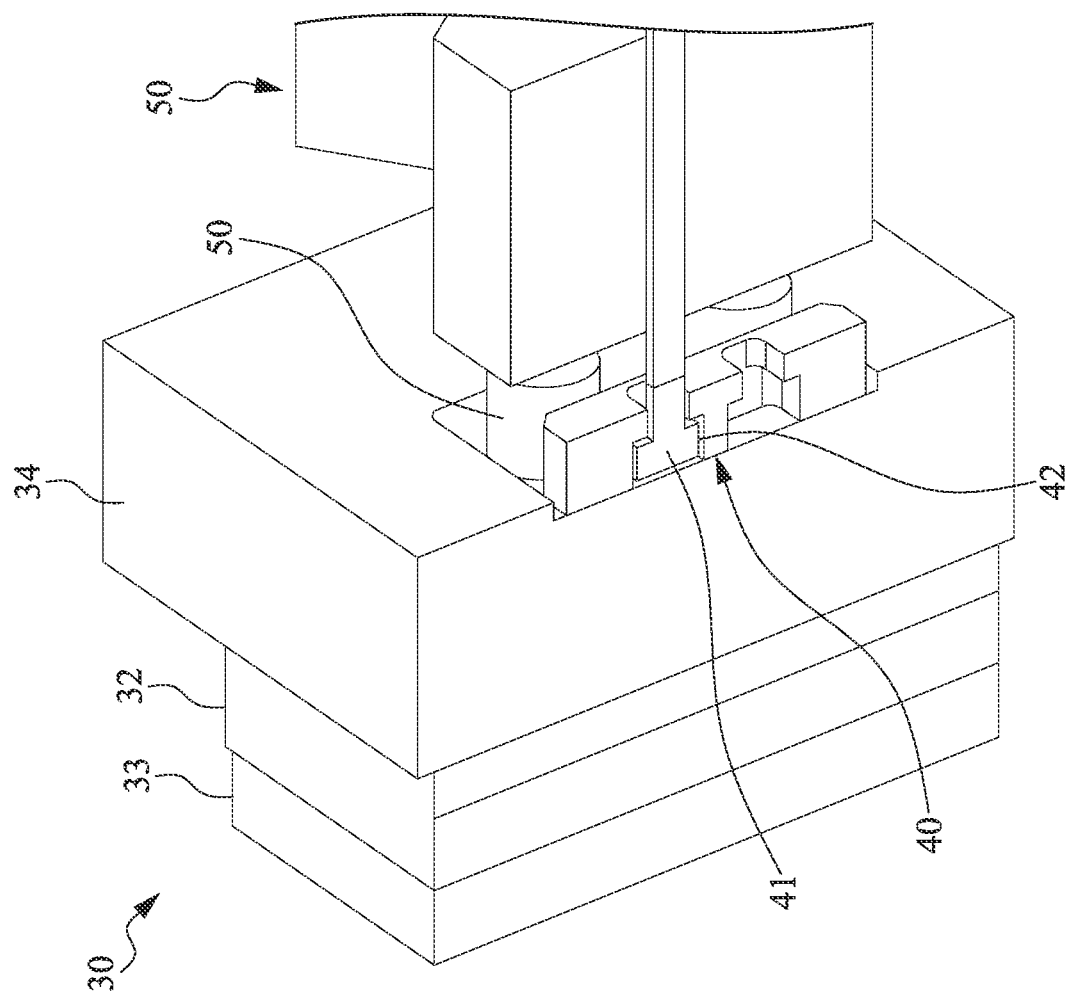
FIGS. 15 and 16 are schematic diagrams of a portion of the injection molding system 100 according to one embodiment of the present disclosure.

FIG. 15 is a schematic diagram of a portion of the injection molding system 100 according to one embodiment of the present disclosure. In some embodiments, referring to FIG. 15, the supporting device 40 includes first and second elements 41, 42 configured to engage with each other, wherein the first element 41 protrudes from the extruding system 10 or the discharging channel 50, and the second element 42 is disposed on the molding devices 30, but the disclosure is not limited thereto. In some embodiments, the first and second elements, 41, 42 can be clamped to each other; for example, the second element 42 is configured to receive the first element 41.

In some embodiments, the supporting device 40 is disposed adjacent to the mold cavity 31 of the molding device. In some embodiments, the first element 41 is disposed on the discharging channel 50, and the second element 42 is disposed on the molding device 30. In some embodiments, the second element 42 is disposed on the mold base 34 of the molding device 30. In some embodiments, the first element 41 is a part of the extruding system 10 or the discharging channel 50, while the second element 42 is a part of the molding device 30. In some embodiments, the first element 41 is a part of the extruding system 10 and disposed adjacent to the discharging channels 50, and the second element 42 is disposed above or facing toward the mold base 34 of the molding device 30. In some embodiments, the first element 41 and the second element 42 can engage with each other, thereby tightly engaging the discharging channels 20 with the mold base 34 of the molding device 30.

In some embodiments, in order to prevent separation of the extruding system 10 and the molding device 30 during the injection, the engaged first element 41 is subjected to a force to against the second element 42. The force may be equal to or greater than a threshold. The threshold may be adjusted according to the pressure in the mold cavity 31 and the diameter of the outlet 51, or according to other factors.

The position and number of the first element 41 may be adjusted according to requirements, and are not particularly limited. The position and number of the second element 42 may also be adjusted according to requirements, and are not particularly limited. In some embodiments, the position and number of the second element 42 correspond to the position and number of the first element 41. In an embodiment, the first element 41 can be disposed at any suitable position on the discharging channel 50, and the second element 42 can be disposed at any suitable position on the molding device 30. In some embodiments, the second element 42 is disposed adjacent to the upper mold 32.

Figure 16:
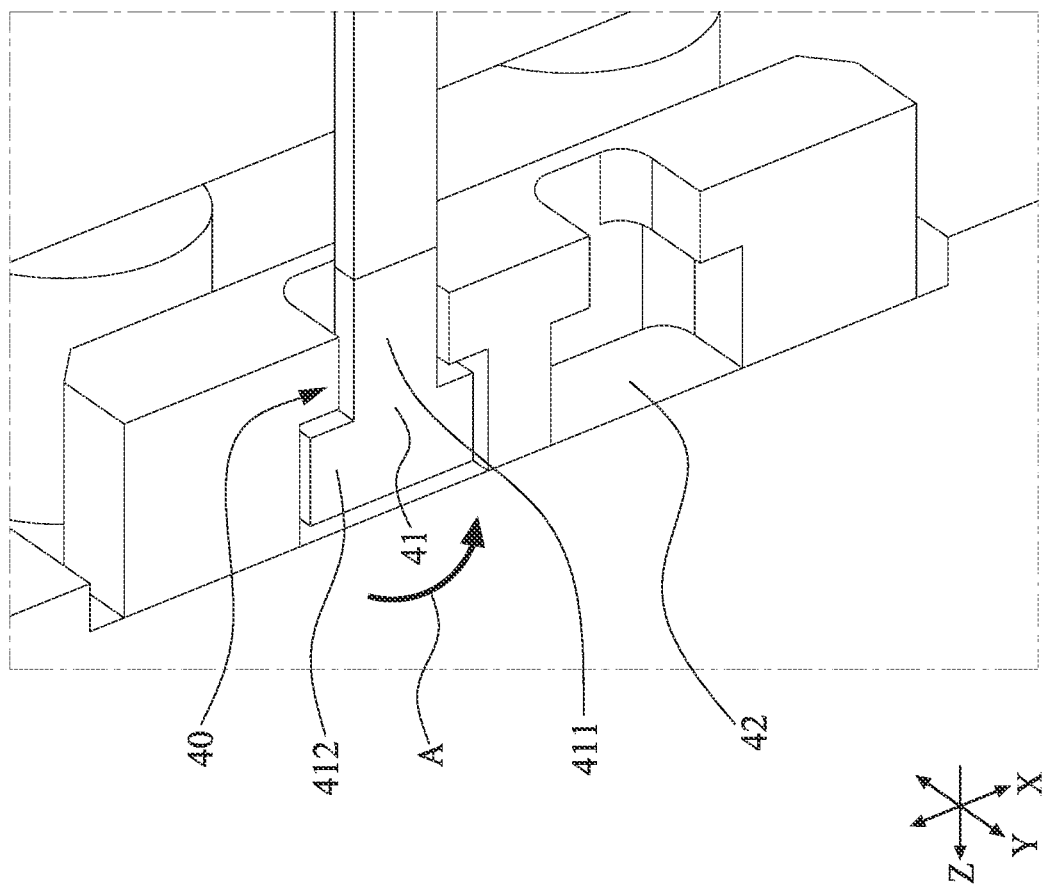

FIG. 16 is a schematic diagram of a portion of the injection molding system 100 according to one embodiment of the present invention. In some embodiments, referring to FIG. 16, the supporting device 40 can be in either of two states, a locked state and an unlocked state. In the unlocked state, the first element 41 enters the corresponding second element 42 but has not yet been locked with the second element 42, In other words, the first element 41 can still be withdrawn from the second element 42 when the supporting device 40 is in the unlocked state. In the locked state, the first element 41 enters and locks with the corresponding second element 42, such that the first element 41 cannot be withdrawn from the second element 42. FIG. 16 illustrates the supporting device 40 in the locked state. The supporting device 40 can be operated and controlled manually or automatically. The supporting device 40 can be switched between two states manually or automatically.

In some embodiments, the first element 41 is rotatably fixed to the extruding system 10. In some embodiments, the first element 41 includes an elongated portion 411 and an arm portion 412. The elongated portion 411 and the arm portion 412 are rotatable in a direction indicated by an arrow A. The elongated portion 411 is fixed to the extruding system 10 and extends in a first direction Z toward the upper mold 32. The arm portion 412 is coupled to the elongated portion 411 and extends in a second direction X substantially orthogonal to the first direction Z or in a third direction Y substantially orthogonal to the first direction Z. In some embodiments, the first element 41 has an inverted T shape. After the first element 41 enters the second element 42, the supporting device 40 is changed from the unlocked state to the locked state by rotation of the arm portion 412 of the first element 41. In some embodiments, the first element 41 is locked with the second element 42 by rotating the arm portion 412 of the first element 41 with about 90 degrees. FIG. 16 illustrates the arm portion 412 is locked with the second element 42 after rotating the arm portion 412 with about 90 degrees. As a result, the supporting device 40 is in the locked state, and the discharging channel 20 is tightly engaged with the molding device 30, and thus the injection of the mixture from the extruding system 10 and the discharging channel 50 to the molding device 30 can begin.

In some embodiments, referring to FIGS. 14 to 16, the discharging channel 50 is secured to the molding device 30 by turning the supporting device 40 into the lock state, such as rotating a first element 41 of the supporting device 40 relative to and within a second element 42 of the supporting device 40 while engaging the outlet 51 with the feeding port 35. In some embodiments, when the outlet 51 are docked to the feeding ports 35, the first element 41 enters the second element 42 and then locked with the second element 42. In some embodiments, the discharging channel 50 is secured to the molding device 30 by rotating an elongated portion 411 and an arm portion 412 of the first element 41 of the supporting device 40, the elongated portion 411 is fixed to the extruding system 10 and extends in a first direction Z toward the molding device 30, and the arm portion 412 is coupled to the elongated portion 411 and extends in a second direction X different from the first direction Z.

Figure 17:
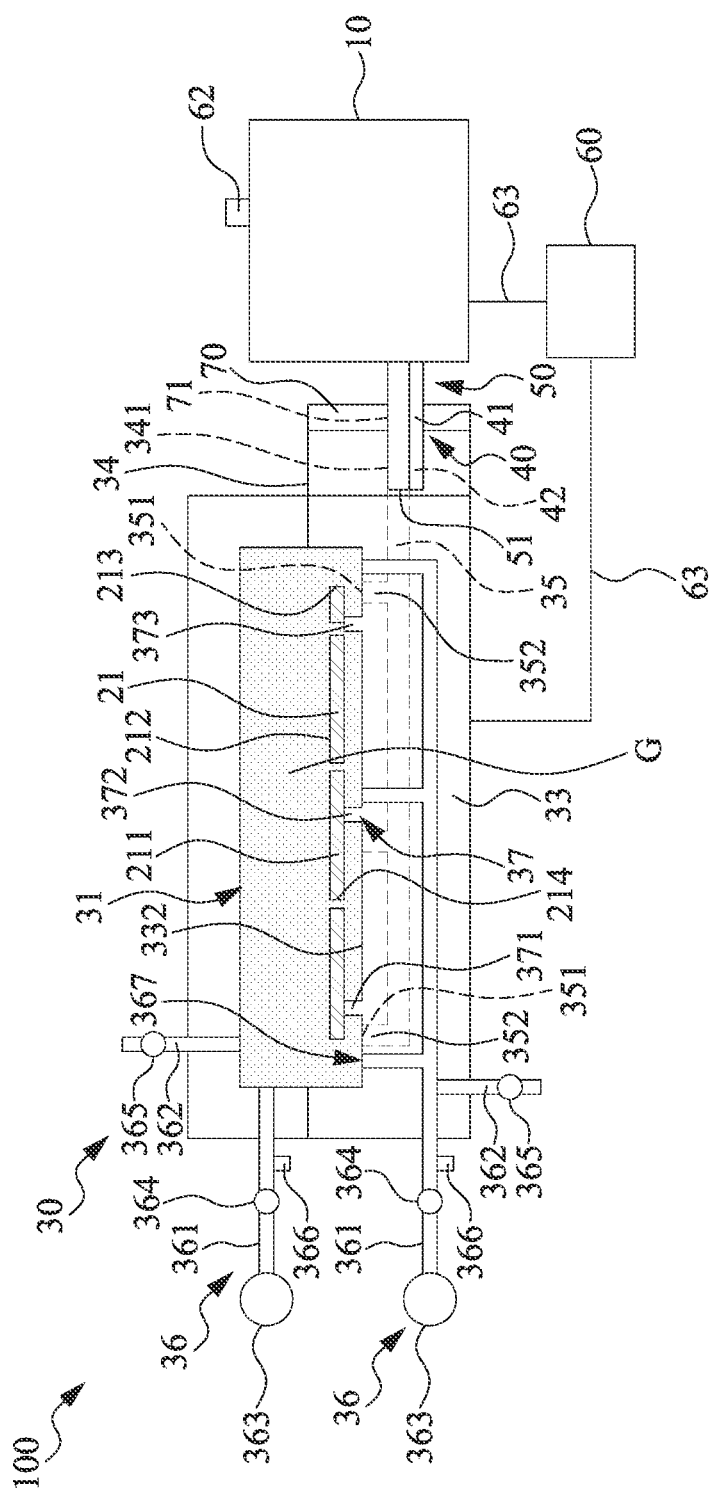

In some embodiments, referring to FIG. 17, the method 700 further includes injecting a gas G into the mold cavity 31 through a pressure-regulating system 36 in connection with the mold cavity 31 until the mold cavity 31 is sensed to have a first predetermined pressure before injecting the molding material into the mold cavity 31. In some embodiments, the gas G injected into the mold cavity 31 through a first gas conduit 361. In some embodiments, the gas G is any suitable gas depending on the need; for example, air; however, the present invention is not limited thereto. In some embodiments, after the engagement of the outlets 51 and the feeding portion 35, the pressure in the mold cavity 31 of the molding device 30 is adjusted to the first predetermined pressure. After the molding device 30 has the first predetermined pressure, the injection begins.

In some embodiments, the pressure sensing unit 366 senses that the pressure in the mold cavity 31 is the atmospheric pressure. In some embodiments, a first valve 364 is opened so that a gas G is injected into the mold cavity 31 through the first gas conduit 361. In some embodiments, the gas G is injected into the mold cavity 31 through the pressure-regulating system 36 when the feeding port 35 is closed. In some embodiments, the gas G is injected into the mold cavity 31 through the feeding port 35.

In some embodiments, during the process of injecting the gas G into the mold cavity 31, the pressure in the mold cavity 31 is sensed continuously. In some embodiments, the pressure sensing unit 366 continuously senses the pressure in the mold cavity 31, and the gas G is injected into the mold cavity 31 until it is senses that the mold cavity 31 has the first predetermined pressure; then, the first valve 364 and the second valve 365 of the pressure-regulating, system 36 are closed, and the gas G injection into the mold cavity 31 is stopped. In some embodiments, the first predetermined pressure is greater than the atmospheric pressure. In some embodiments, the first predetermined pressure is less than the atmospheric pressure.

In some embodiments, the mold cavity 31 has the first predetermined pressure before operation 704, and the first valve 364 and the second valve 365 of the pressure-regulating system 36 are closed.

In some embodiments, the method 700 includes operation 704, which includes injecting a first material M1 into the mold cavity 31. In some embodiments, the molding material made by the extruding system 10 is the first material M1. The first material M1 includes a polymeric material and a blowing agent. In some embodiments, referring to FIG. 18, the first material M1 is injected into the mold cavity 31 through the outlet 51 and the feeding port 35. In some embodiments, operation 704 includes injecting the first material M1 from the discharging channel 50 into the mold cavity 31 through the outlet 51 and the feeding port 35. In some embodiments, the discharging channel 50 is at least partially surrounded by the molding device 30 upon the injection of the first material M1.

In some embodiments, at least a portion the first material M1 is disposed between the inner wall 332 of the first mold 33 and the core 21. In some embodiments, at least a portion the first material M1 is disposed between the supporting units 371, 372, 373. In some embodiments, at least a portion of the first material M1 is disposed within the recess 215 or the through hole 214 of the core 21. In some embodiments, at least a portion of the first material M1 surrounds the protrusion 216 of the core 21.

In some embodiments, in operation 704, during the process of injecting the first material M1 into the mold cavity 31 of the molding device 30, the pressure in the mold cavity 31 changes rapidly, and the pressure-sensing unit 366 continuously senses the pressure in the mold cavity 31. In some embodiments, the first material M1 is injected into the mold cavity 31 of the molding device 30 from the feeding port 35, and the first predetermined pressure applies to the first material M1. In some embodiments, the first material M1 and the gas G are disposed in the mold cavity 31, and the first material M1 will expand and foam in the mold cavity 31.

In some embodiments, the first material M1 is injected into the mold cavity 31 of the molding device 30 from the feeding port 35, and thereby increasing the pressure in the mold cavity 31. In some embodiments, the pressure in the mold cavity 31 of the molding device 30 is raised above the first predetermined pressure. In some embodiments, the pressure in the mold cavity 31 of the molding device 30 is raised from the first predetermined pressure to a second predetermined pressure.

In some embodiments, after the first material M1 is injected into the mold cavity 31 having the first predetermined pressure, the pressure in the mold cavity 31 increases, and therefore, the setting of a second predetermined pressure ensures that the mold cavity 31 is maintained within a suitable pressure range. In some embodiments, when the mold cavity 31 reaches the second predetermined pressure, the injection of first material M1 into the mold cavity 31 is stopped.

In some embodiments, the process of injecting the first material M1 into the mold cavity 31 having the first predetermined pressure lasts for less than 1 second. In some embodiments, due to the mold cavity 31 has the first predetermined pressure, the completion of the filling the first material M1 may be last for less than 0.5 second. During the injecting period or at the moment of the completion of the injection, the pressure in the mold cavity 31 is sensed by the pressure-sensing unit 366 in real time, and the pressure information is provided, so that the pressure-regulating system 36 can adjust the pressure in the mold cavity 31 in accordance with the pressure information, and hence, the pressure in the mold cavity 31 can be kept within the predetermined pressure range.

In some embodiments, during the process of injection, the temperature of the discharging channel 50 is greater than that of the molding device 30. In some embodiments, the temperature difference is maintained using the insulator 70.

Figure 19:
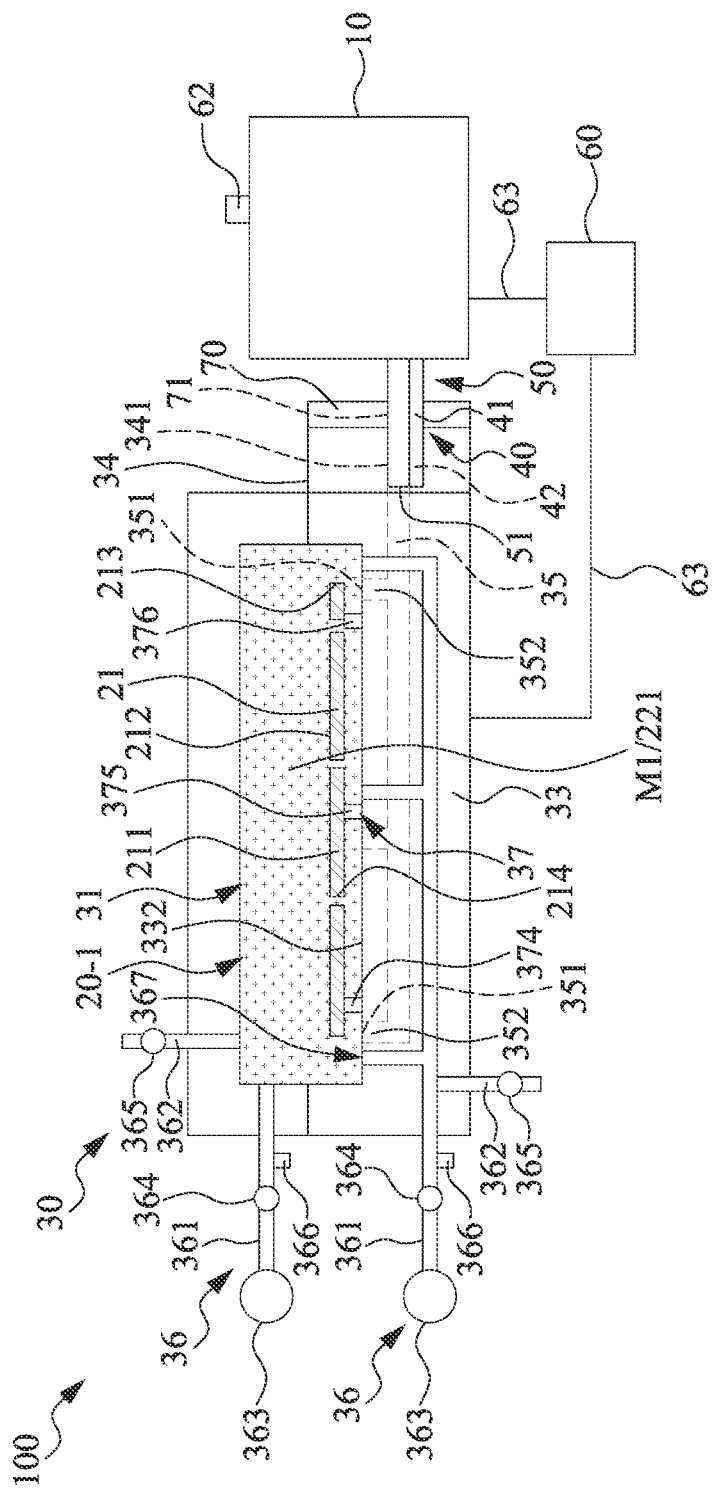

In some embodiments, referring to FIG. 19, in operation 705, the method 700 includes foaming the first material M1 to form a first foamed member 221. At least a portion of the first foamed member 221 is in contact with the core 21. In some embodiments, at least a portion of the foamed member 221 is in contact with at least a portion of the first surface 211, the entire sidewall 213 and the entire second surface 212 of the core 21. In some embodiments, the first surface 211 includes a first portion and a second portion, the first portion is in contact with the first foamed member 221, and the second portion is in contact with the supporting member 37.

In some embodiments, at least a portion the first foamed member 221 is disposed between the inner wall 332 of the first mold 33 and the core 21. In some embodiments, at least a portion the first material M1 is disposed between the supporting units 371, 372, 373. In some embodiments, at least a portion of the first foamed member 221 is disposed within the recess 215 or the through hole 214 of the core 21. In some embodiments, at least a portion of the first foamed member 221 surrounds the protrusion 216 of the core 21. In some embodiments, an article 20-1 is formed after the first foamed member 221 is formed. In some embodiments, the article 20-1 includes the core 21 and the first foamed member 221.

In some embodiments, the method 700 further includes retracting the supporting member 37 into the first mold 33 or removing the supporting member 37 from the mold cavity 31 during or after the injecting the first material M1. In some embodiments, at least one of the supporting units 371, 372, 373 is retreated or removed after the first foamed member 221 is foamed. In some embodiments, after the supporting member 37 is retreated or removed, a mark 374 is formed on the first foamed member 221. In some embodiments, the mark 374 is formed at a position corresponding the position of the supporting member 37. In some embodiments, after the supporting units 371, 372, 373 are retreated or removed, the marks 374, 375, 376 are formed at the positions corresponding to the positions of the supporting units 371, 372, 373, respectively. In some embodiments, the article 20-1 includes the marks 374, 375, 376. In some embodiments, the article 20-1 is free from the marks 374, 375, 376. The first foamed member 221 of article 20-1 encloses the core 21. In some embodiments, the article 20-1 may be further pick out from the molding device 30.

In some embodiments, the second portion of the first surface 211 of the core 21 is exposed through the mark 374, and the feeding opening 351 is disposed adjacent to the mark 374. In some embodiments, each of the feeding openings 351 is disposed adjacent to the corresponding one of the marks 374, 375, 376.

In some embodiments, the method 700 further includes discharging the gas G from the mold cavity 31 to decrease a pressure in the mold cavity 31 to a third predetermined pressure. In some embodiments, a portion of the gas G is discharged from the mold cavity 31 after injecting the gas into the mold cavity 31. In some embodiments, during operation 705, the gas G is discharged in less than 1 second from the mold cavity 31 through the pressure-regulating system 36 while the first material M1 is foaming in the mold cavity 31. Due to the discharging of the gas G, the first material M1 in the mold cavity 31 after the foaming process may have a lower density. In some embodiments, the gas G is discharged from the mold cavity 31 through the junction point 367. In some embodiments, the gas G is discharged from the mold cavity 31 during or after the foaming process of the first material M1 in the mold cavity 31. In some embodiments, the pressure in the mold cavity 31 is decreased from the second predetermined pressure.

In some embodiments, when the pressure-sensing unit 366 senses that the pressure in the mold cavity 31 is greater than the second predetermined pressure, a portion of the gas G in the mold cavity 31 is discharged until the pressure in the mold cavity 31 is within a predetermined pressure range. In some embodiments, the predetermined pressure range is between the first predetermined pressure and the second predetermined pressure. In some embodiments, the second valve 365 is open and a portion of the gas G in the mold cavity 31 is discharged through the second gas conduit 362.

Figure 20:
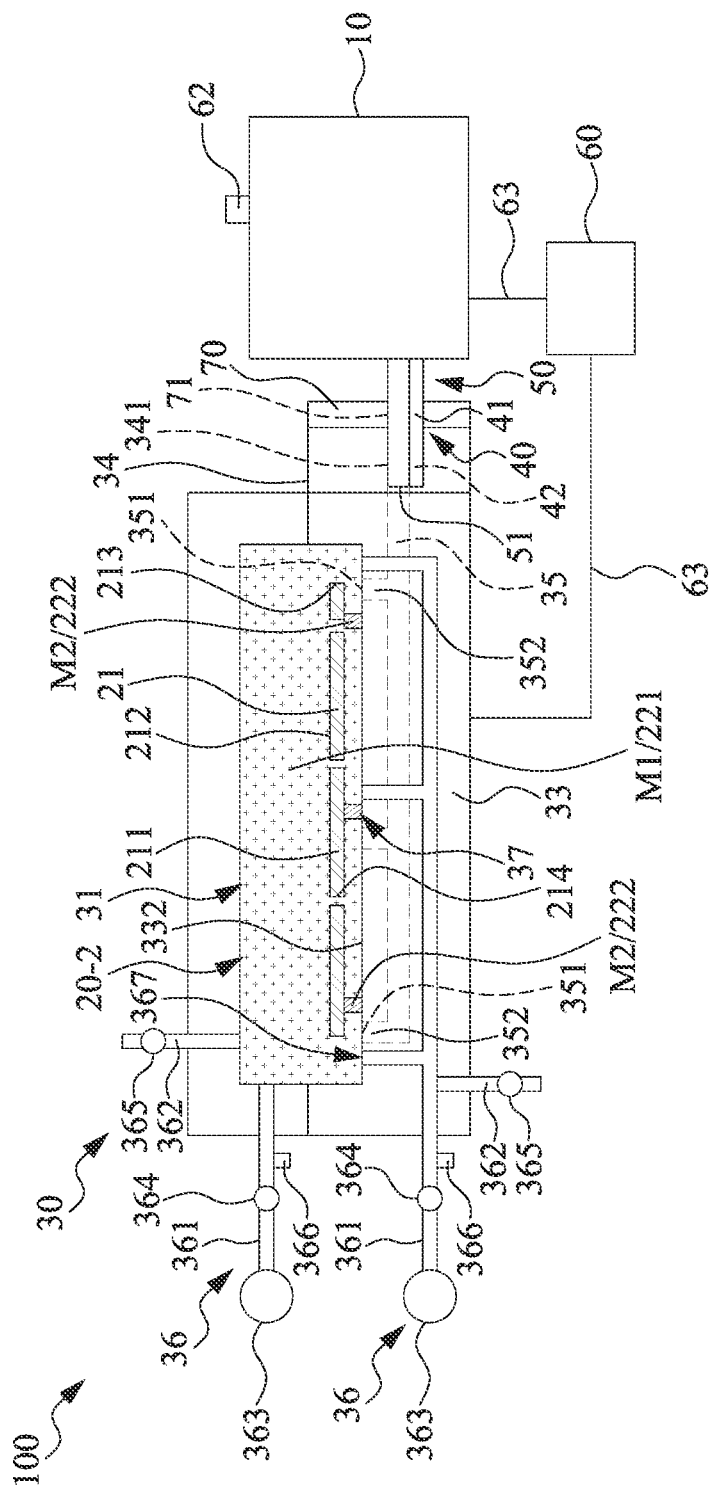

In some embodiments, referring to FIG. 20, the method 700 further includes injecting a second material M2 into the mold cavity 31 after the supporting member 37 is removed or retracted. In some embodiments, a ratio of a polymeric material to a blowing agent in the first material M1 is substantially equal to a ratio of the polymeric material to the blowing agent in the second material M2. In some embodiments, composition of the first material M1 is similar to that of the second material M2. In some embodiments, the core 21 is enclosed by the first material M1 and the second material M2.

In some embodiments, the molding material made by the extruding system 10 is the second material M2. In some embodiments, the second material M2 is injected into the mold cavity 31 through the outlet 51 and the feeding port 35. In some embodiments, the second material M2 is injected from the discharging channel 50 into the mold cavity 31 through the outlet 51 and the feeding port 35. In some embodiments, the discharging channel 50 is at least partially surrounded by the molding device 30 upon the injection of the second material M2.

In some embodiments, a position where the second material M2 disposed is corresponding to the position of the supporting member 37. In some embodiments, the second material M2 is disposed within the mark 374. In some embodiments, after the marks 374, 375, 376 are formed at the positions corresponding to the positions of the supporting units 371, 372, 373, respectively, the second material M2 is disposed within the marks 374, 375, 376. In some embodiments, at least a portion of the second material M2 is in contact the first surface 211 of the core 21. In some embodiments, the first foamed member 221 surrounds the second material M2. In some embodiments, at least a portion of the second material M2 is in contact the first foamed member 221.

In some embodiments, the method 700 further includes foaming the second material M2 to form a second foamed member 222. In some embodiments, the core 21 is enclosed by the first foamed member 221 and the second foamed member 222. In some embodiments, at least a portion of the second foamed member 222 is in contact the first surface 211 of the core 21. In some embodiments, the first foamed member 221 surrounds the second foamed member 222. In some embodiments, at least a portion of the second foamed member 222 is in contact the first foamed member 221. In some embodiments, an article 20-2 is formed after the first foamed member 221 and the second foamed member 222 are formed. In some embodiments, the article includes the core 21, the first foamed member 221 and the second foamed member 222.

Figure 21:
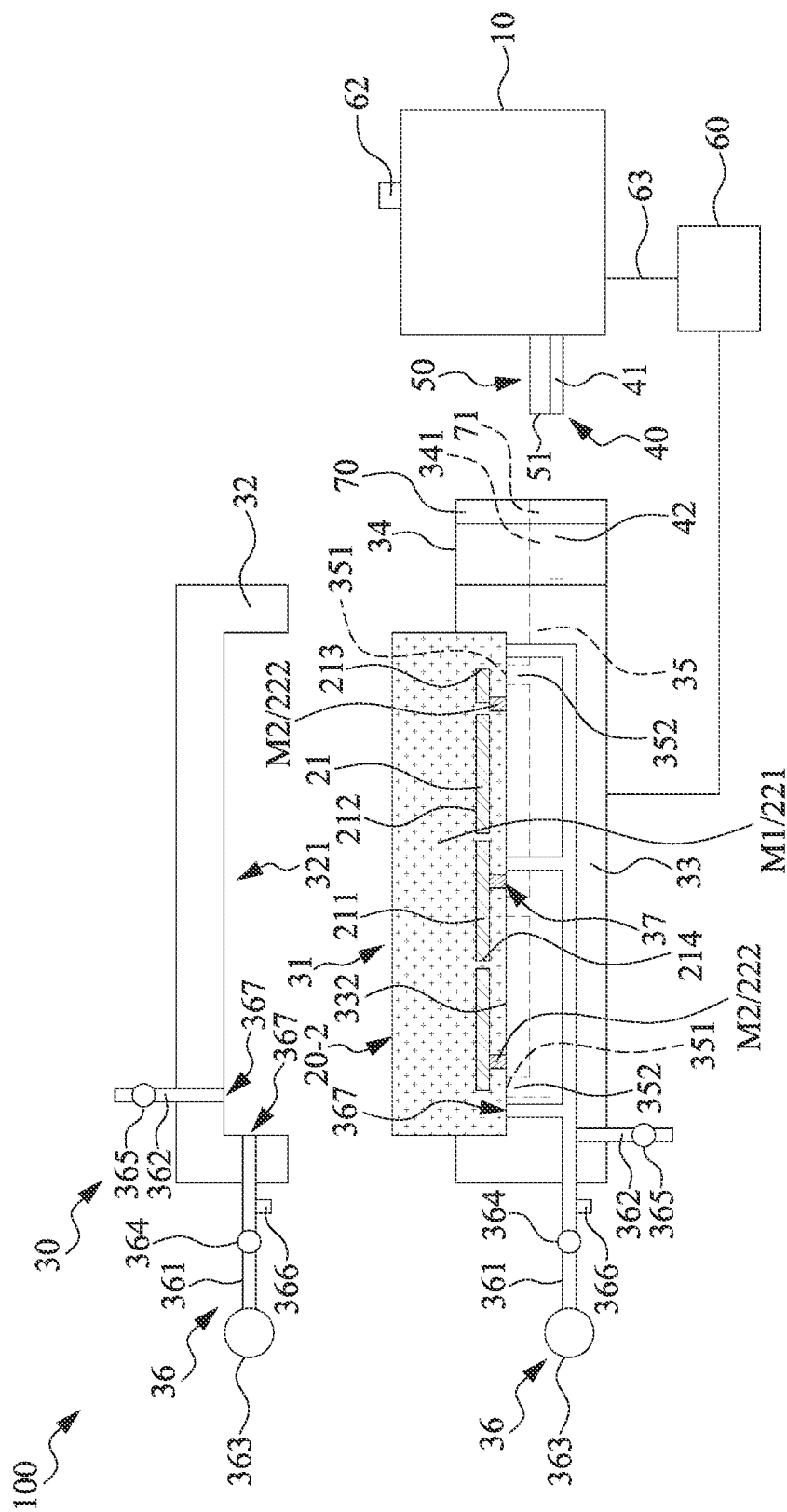
Figure 22:
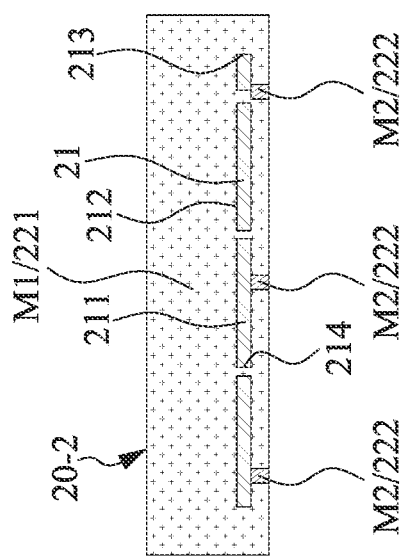
FIG. 22 is a schematic diagram of illustrating an exemplary article according to one embodiment of the present disclosure.

In some embodiments, after the formation of the second foamed member 222, the second mold 32 leaves the first mold 33, and the discharging channel 50 is disengaged and withdrawn from the molding device 30, as shown in FIG. 21. The outlet 51 is disengaged with the feeding port 35. The molding device 30 is changed from the closed configuration (FIGS. 17 to 20) to an open configuration (FIG. 21).

In some embodiments, referring to FIG. 22, after the formation of the article 20-2, the article 20-2 is then picked out from the first mold 33. In some embodiments, the article 20-2 is picked out manually by human, or automatically by robot, robotic arm, gripper or the like.

Figure 25:
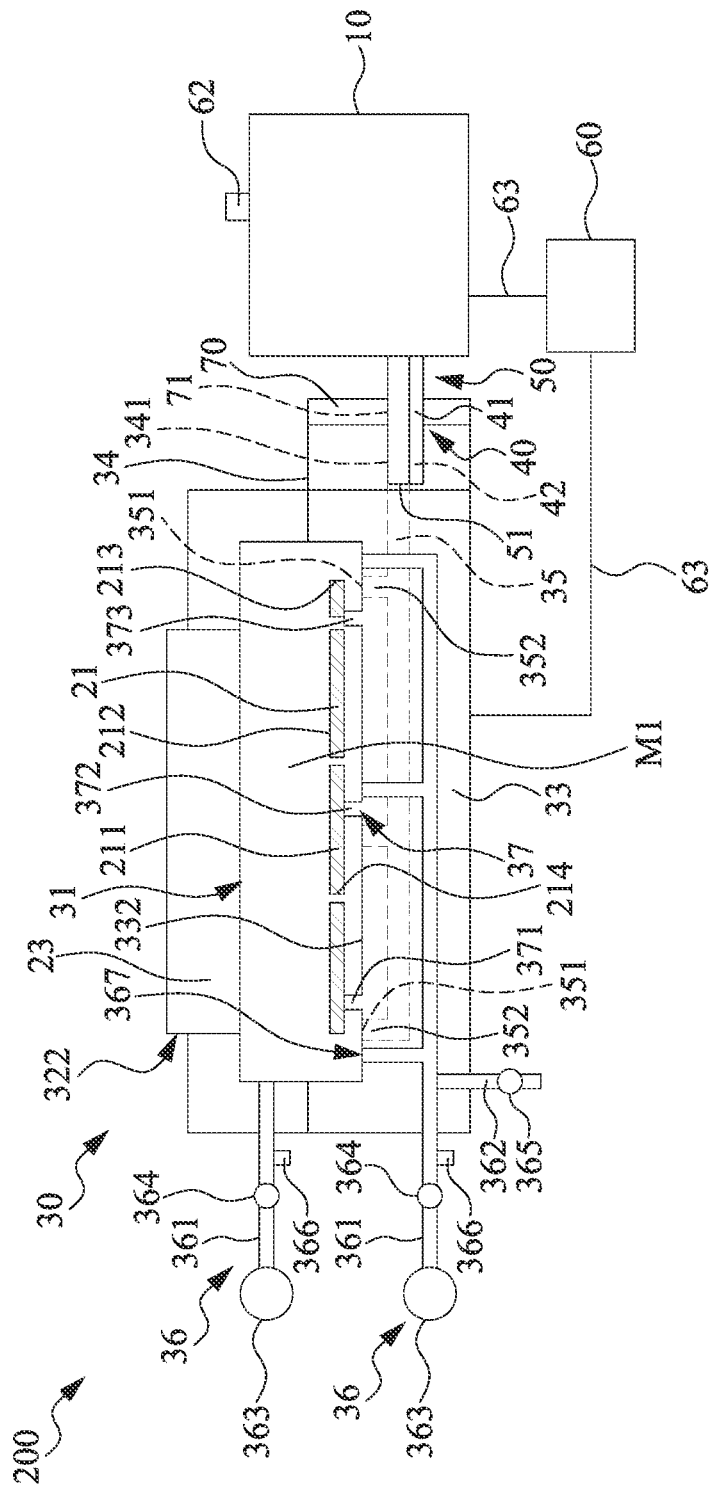
Figure 26:
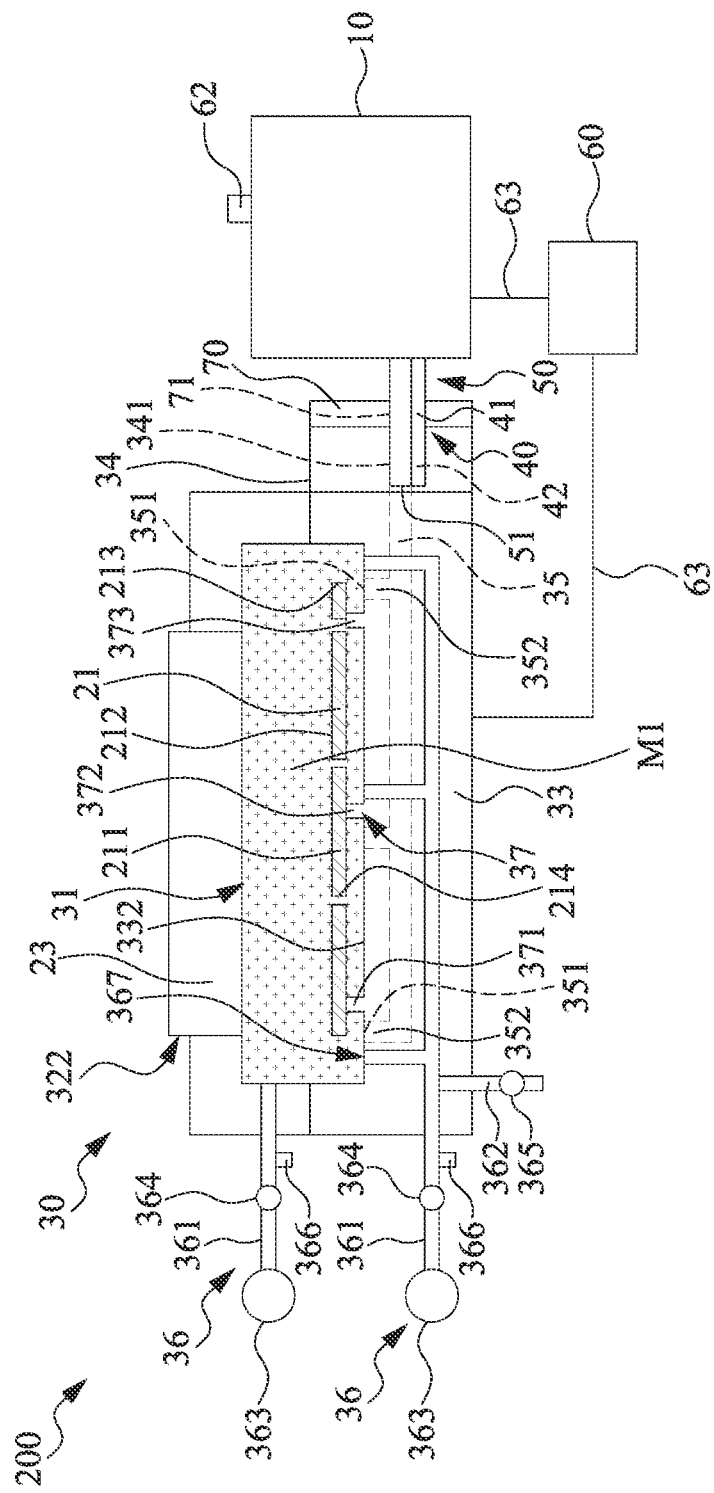
Figure 27:
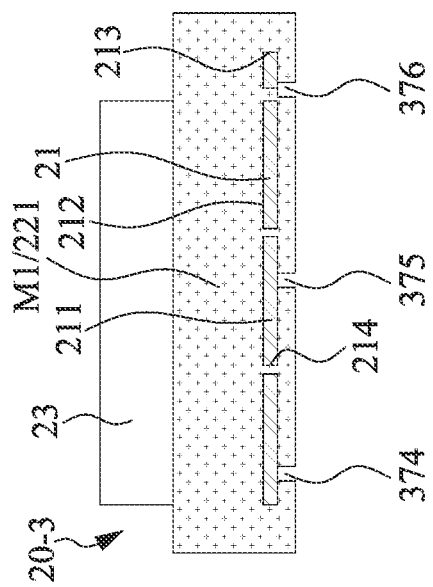
FIGS. 27 and 28 are schematic diagrams of illustrating an exemplary article according to one embodiment of the present disclosure.
Figure 28:
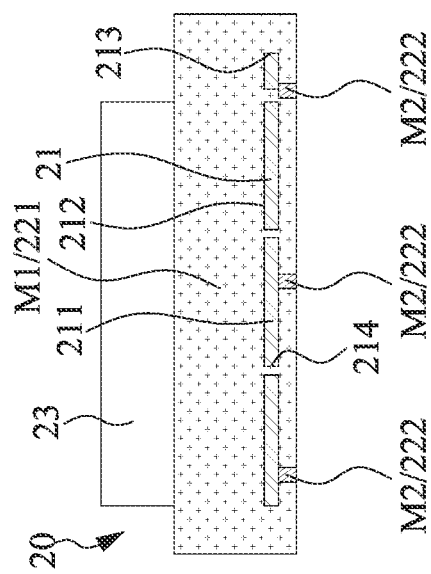

In some embodiments, the method 700 further includes disposing a component 23 within an opening 322 of the second mold 32 prior to the injection of the first material M1. FIGS. 23 to 26 are schematic cross-sectional views illustrating an injection molding system 200 of the operations 701 to 705 of the method 700 in accordance with some embodiments of the present disclosure. FIGS. 27 and 28 are schematic cross-sectional views illustrating an article 20-3 manufactured by the method 700 in accordance with some embodiments of the present disclosure.

Figure 18:
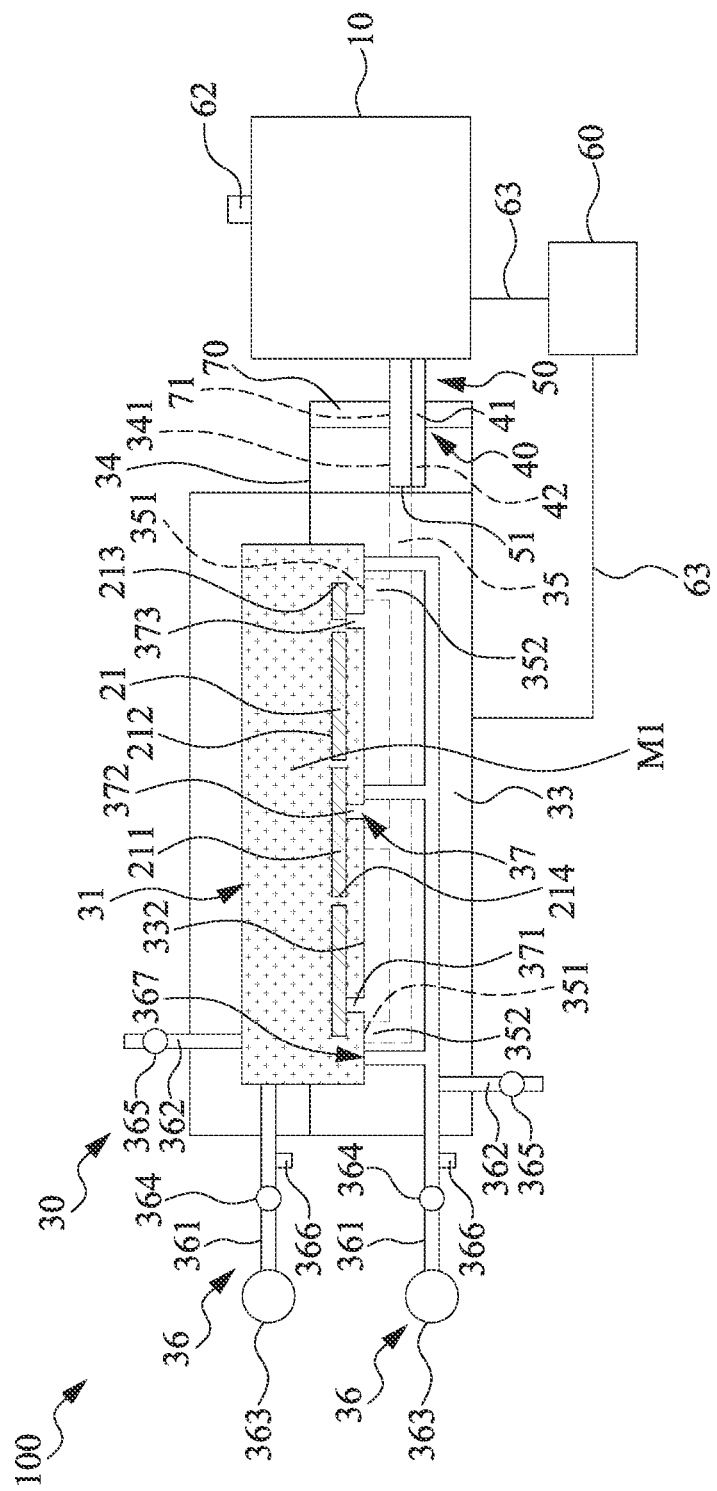
Figure 23:
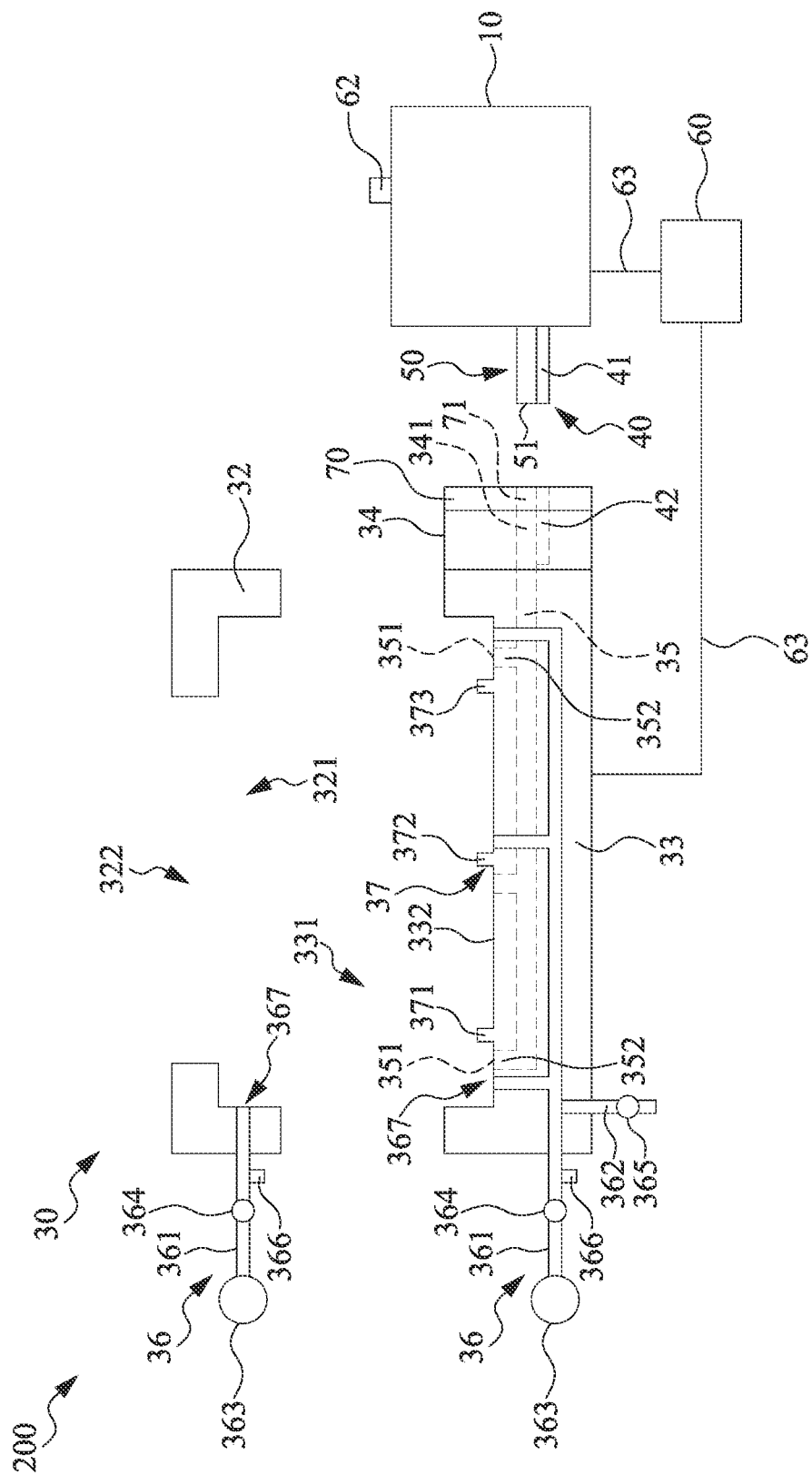
FIGS. 23 to 26 are schematic cross-sectional views illustrating exemplary operations in a method of manufacturing an article according to one embodiment of the present disclosure.
Figure 24:
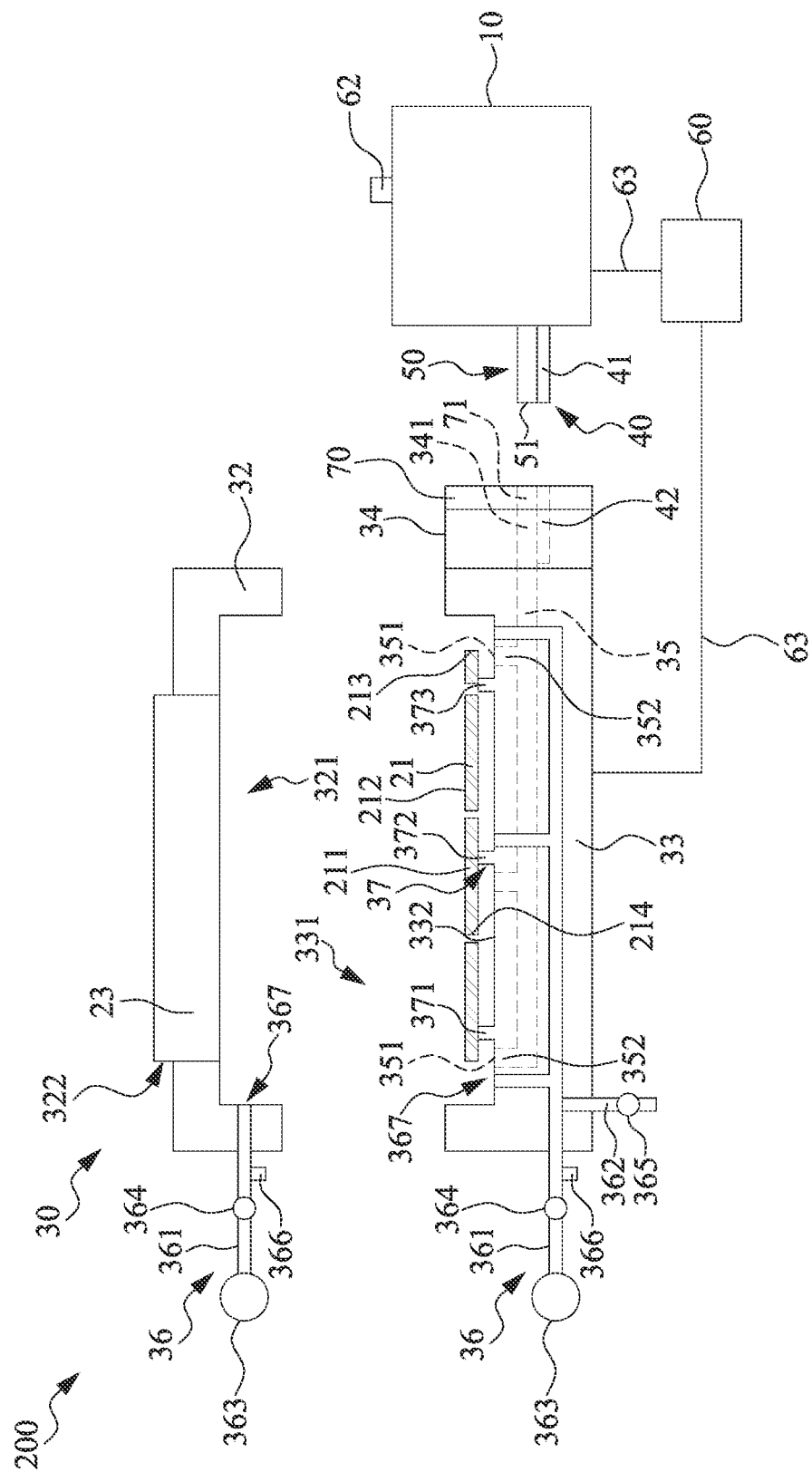

In some embodiments, referring to FIG. 23, the second mold 32 is in another configuration that includes an opening 322. In some embodiments, the second mold 33 includes an opening 322 disposed opposite to the first mold 33. In some embodiments, referring to FIG. 24, a component 23 is receivable by and disposed within the opening 322. In some embodiments, the mold cavity 31 is defined by the first mold 33, the second mold 32 and the component 23 as shown in FIG. 25. In some embodiments, the first material M1 is injected into the mold cavity 31 between the component 23 and the inner wall 332 of the first mold 33 as shown in FIG. 26, similar to the operation as shown in FIG. 18. The component 23 is in contact with the first material M1 during formation of the first foamed member 221. As such, an article 20-3 is fabricated shown in FIG. 26. In some embodiments, the article 20-3 is a product or a semi-product including includes the component 23 and the first foamed member 221, at least a portion of the first foamed member 221 is disposed between the core 21 and the component 23.

In some embodiments, the component 23 is an insole, a footwear upper or any other suitable component of the footwear.

In some embodiments, referring to FIG. 27, the article 20-3 further includes the mark 374. In some embodiments, the article 20-3 further includes the plurality of marks 374, 375, 376. In some embodiments, referring to FIG. 28, the article 20-3 further includes the second foamed member 222 formed by the second material M2.

Figure 29:
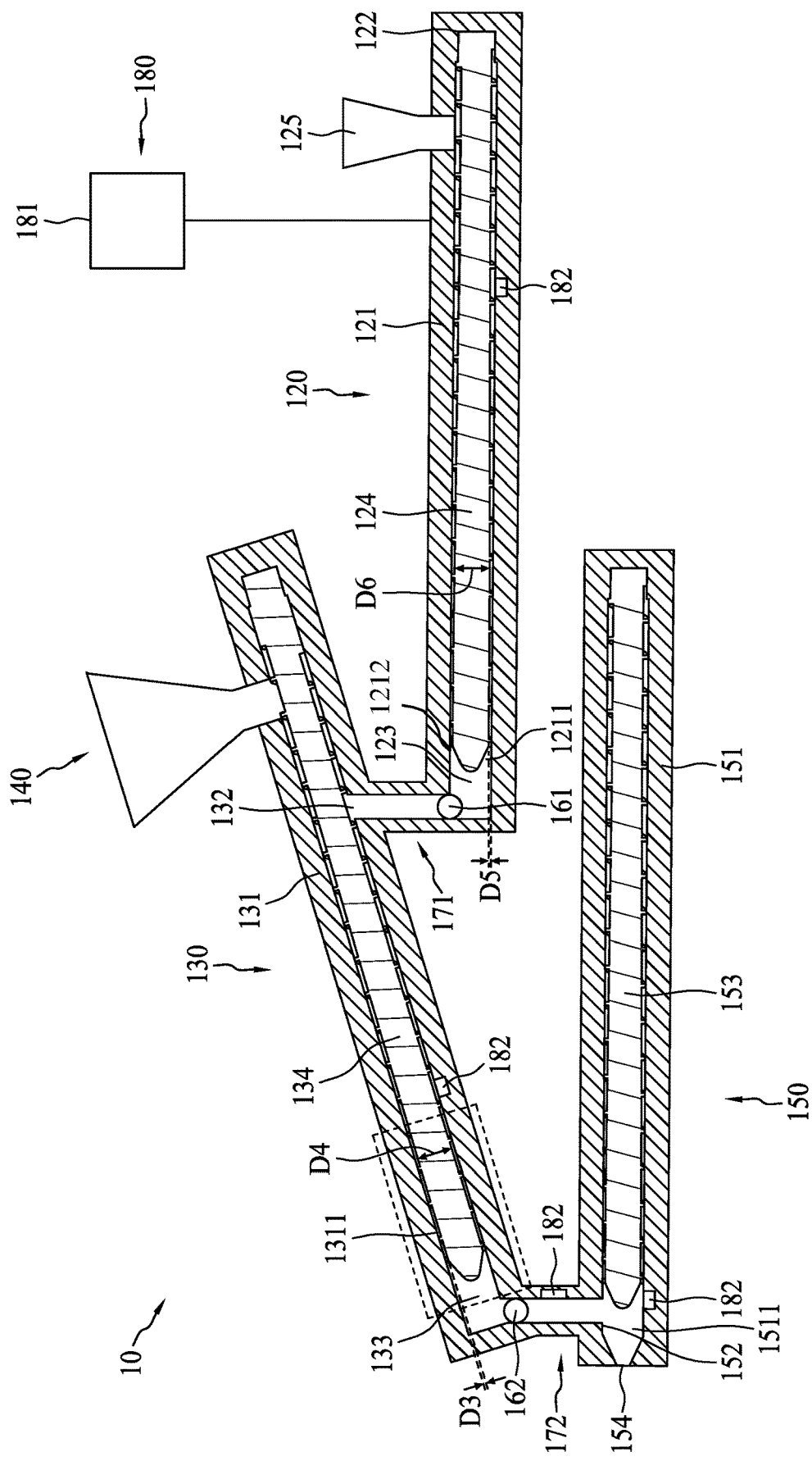
FIG. 29 is a schematic diagram of a portion of an injection molding system in FIG. 1 according to one embodiment of the present invention.

In some embodiments, the method 700 includes injecting the first material M1 and the second material M2 from the extruding system 10 into the discharging channel 50. FIG. 29 is a schematic diagram of the extruding system according to aspects of the present disclosure in some embodiments. The extruding system 10 includes a melting unit 120 and a mixing unit 130. In some embodiments, the extruding system 10 includes the melting unit 120, the mixing unit 130, a blowing agent supply unit 140, an injection unit 150, a first flow control element 161, a second flow control element 162, and a monitoring module 180.

In some embodiments, referring to FIG. 29, the melting unit 120 is configured to convey the polymeric material. In some embodiments, the melting unit 120 includes a pressing cartridge 121, a first feeding passage 122, a first discharging passage 123, and a pushing member 124. In some embodiments, the melting unit 120 further includes a feeding hopper 125.

In some embodiments, the first feeding passage 122 and the first discharging passage 123 are respectively disposed at two ends of the pressing cartridge 121. In some embodiments, the first feeding passage 122 communicates with an inner space 1211 of the pressing cartridge 121, and the first discharging passage 123 communicates with an external space of the pressing cartridge 121, wherein the first feeding passage 122 is configured to deliver the polymeric material to the inner space 1211 of the pressing cartridge 121. In some embodiments, the feeding hopper 125 is configured to deliver a polymeric material to the inner space 1211 of the pressing cartridge 121 through the first feeding passage 122.

The pushing member 124 is configured to convey the polymeric material from the first feeding passage 122 to the first discharging passage 123. In some embodiments, the pushing member 124 is disposed in the inner space 1211 of the pressing cartridge 121. In some embodiments, the pushing member 124 is disposed in the inner space 1211 of the pressing cartridge 121 between the first feeding passage 122 and the first discharging passage 123, and is used to force the polymeric material toward the first discharging passage 123. In some embodiments, the pushing member 124 is rotatable relative to the pressing cartridge 121. In some embodiments, the polymeric material is conveyed from the first feeding passage 122 to the first discharging passage 123 by rotation of the pushing member 124. In some embodiments, the pushing member 124 is immovable in a direction parallel to the longitudinal axis of the pressing cartridge 121.

In some embodiments, a length of the pushing member 124 extends along a length of the pressing cartridge 121, and a ratio of a shortest distance D5 between an inner sidewall 1212 of the pressing cartridge 121 and the pushing member 124 and a diameter D6 of the pushing member 124 is in a range of about 1:1500 to about 1:4500, and the polymeric material melted by the melting unit 120 may be uniformed. In some embodiments, the shortest distance D5 between an inner sidewall 1212 of the pressing cartridge 121 and the pushing member 124 is substantially equal to or less than 0.3 mm. In some embodiments, the shortest distance D5 between the inner sidewall 1212 of the pressing cartridge 121 and the pushing member 124 ranges between 0.01 and 0.05 mm.

The mixing unit 130 is configured to receive the polymeric material from the melting unit 120 and configured to mix the polymeric material with a blowing agent and to form a mixture of the polymeric material and the blowing agent. The mixing unit 130 includes a hollow mixing cartridge 131, a second feeding passage 132, a second discharging passage 133, and a mixing rotor 134.

The second feeding passage 132 and the second discharging passage 133 are respectively disposed at two ends of the mixing cartridge 131. In some embodiments, the second feeding passage 132 is configured to deliver the polymeric material. In some embodiments, the second discharging passage 133 is configured to discharge the mixture.

The mixing rotor 134 is configured to mix the polymeric material with the blowing agent to form a mixture in the mixing cartridge 131. In some embodiments, the mixing rotor 134 is disposed in the mixing cartridge 131. In some embodiments, the mixing rotor 134 is disposed in the mixing cartridge 131 between the second feeding passage 132 and the second discharging passage 133, so as to agitate the mixture in the mixing cartridge. The mixing rotor 134 is rotatable to mix the polymeric material with the blowing agent and to convey the mixture of the polymeric material and the blowing agent from the second feeding passage 132 to the second discharging passage 133. In some embodiments, the mixing rotor 134 is immovable in a direction parallel to the longitudinal axis of the mixing cartridge 131.

In some embodiments, a length of the mixing rotor 134 extends along a length of the hollow mixing cartridge 1:31, and a ratio of a shortest distance D3 between an inner sidewall 1311 of the hollow mixing cartridge 131 and the mixing rotor 134 and a diameter D4 of the mixing rotor 134 is in a range of about 1:1500 to about 1:4500, and the mixture prepared by the extruding system 10 may be even and uniformed. In some embodiments, the mixture may be divided in to a plurality of portions, and a ratio of the blowing agent to the polymeric material of each portion of the mixture prepared by the extruding system 10 is substantially constant. In some embodiments, a ratio of the polymeric material to the blowing agent in a first portion of the mixture is substantially equal to a ratio of the polymeric material to the blowing agent in a second portion of the mixture. In some embodiments, the shortest distance D3 between the inner sidewall 1311 of the hollow mixing cartridge 131 and the mixing rotor 134 is substantially equal to or less than 0.3 mm. In some embodiments, the shortest distance D3 between the inner sidewall 1311 of the hollow mixing cartridge 131 and the mixing rotor 134 ranges between 0.01 and 0.09 mm.

Figure 30:
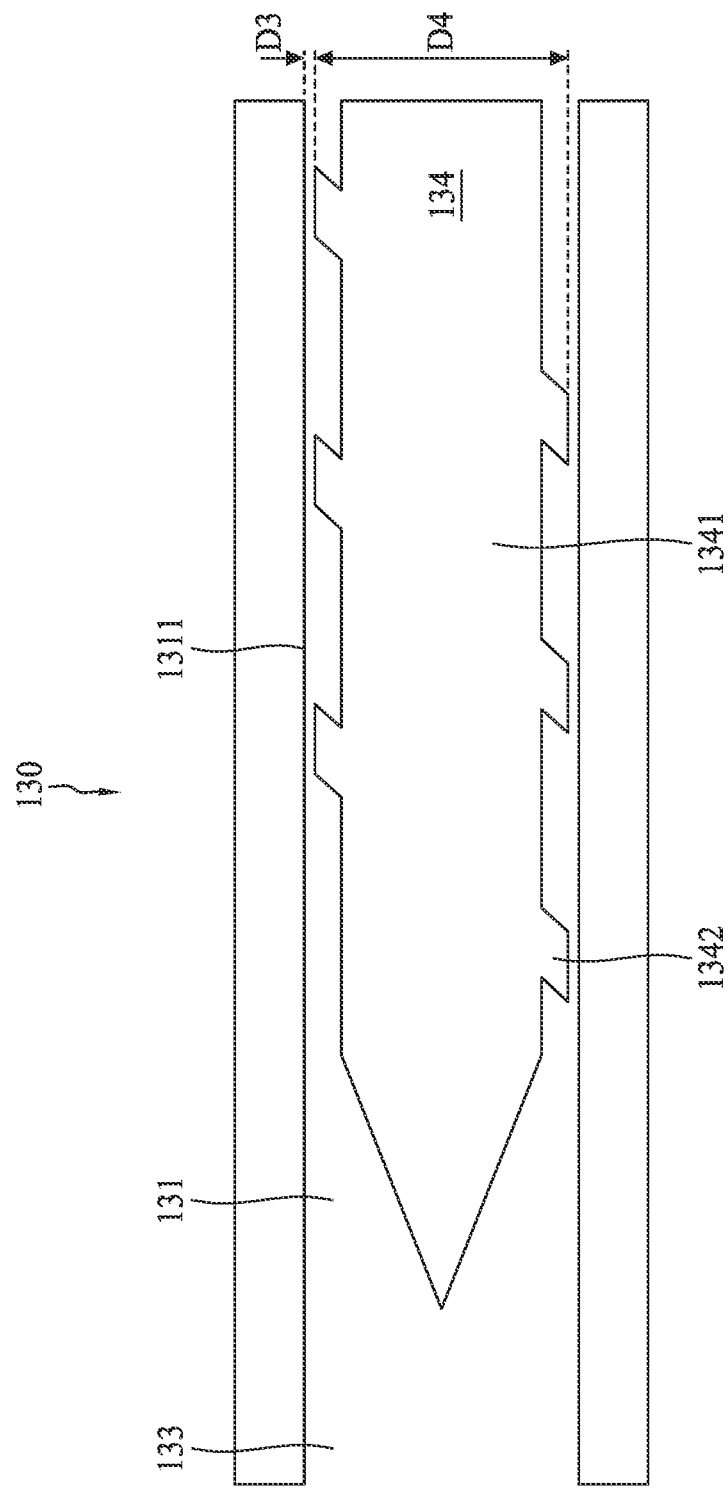
FIG. 30 is an enlarged view of a portion of an injection molding system enclosed by a dash line in FIG. 29 according to one embodiment of the present invention.

FIG. 30 is an enlarged view of a portion of the extruding system according to aspects of the present disclosure in some embodiments. To enable the melted polymeric material and the blowing agent to mix uniformly in the mixing cartridge 131, in some embodiments, referring to FIGS. 29 and 30, the mixing rotor 134 further includes a column-like body 1341 in a cylindrical shape and rotatably disposed in the mixing cartridge 131, and a groove portion 1342 annularly arranged on the periphery of the column-like body 1341. Therefore, when the column-like body 1341 rotates, the polymeric material and the blowing agent are agitated by the groove portion 1342, so as to achieve a desired mixing effect. In some embodiments, the shortest distance D3 is a shortest distance between the groove portion 1342 and the inner sidewall 1311 of the hollow mixing cartridge 131.

In some embodiments, when the shortest distance D3 is a shortest distance between the groove portion 1342 and the inner sidewall 1311 of the hollow mixing cartridge 131, the shortest distance D3 ranges between 0.01 and 0.09 mm. In some embodiments, the diameter D4 of the mixing rotor 134 ranges between the 45 to 75 mm. Table 1 lists the shortest distance D3, the diameter 134 and the corresponding ratio of the a shortest distance D3 distance between the groove portion 1342 and the inner sidewall 1311 of the hollow mixing cartridge 131 and a diameter D4 of the mixing rotor 134.

TABLE 1

| diameter D4 (mm) | 45 | | 55 | | 65 | | 75 | |
|---|---|---|---|---|---|---|---|---|
| shortest distance D3 (mm) | 0.01 | 0.02 | 0.02 | 0.03 | 0.03 | 0.04 | 0.04 | 0.05 |
| D4/D3 | 4500 | 2250 | 2750 | 1833 | 2167 | 1625 | 1875 | 1500 |

Figure 31:
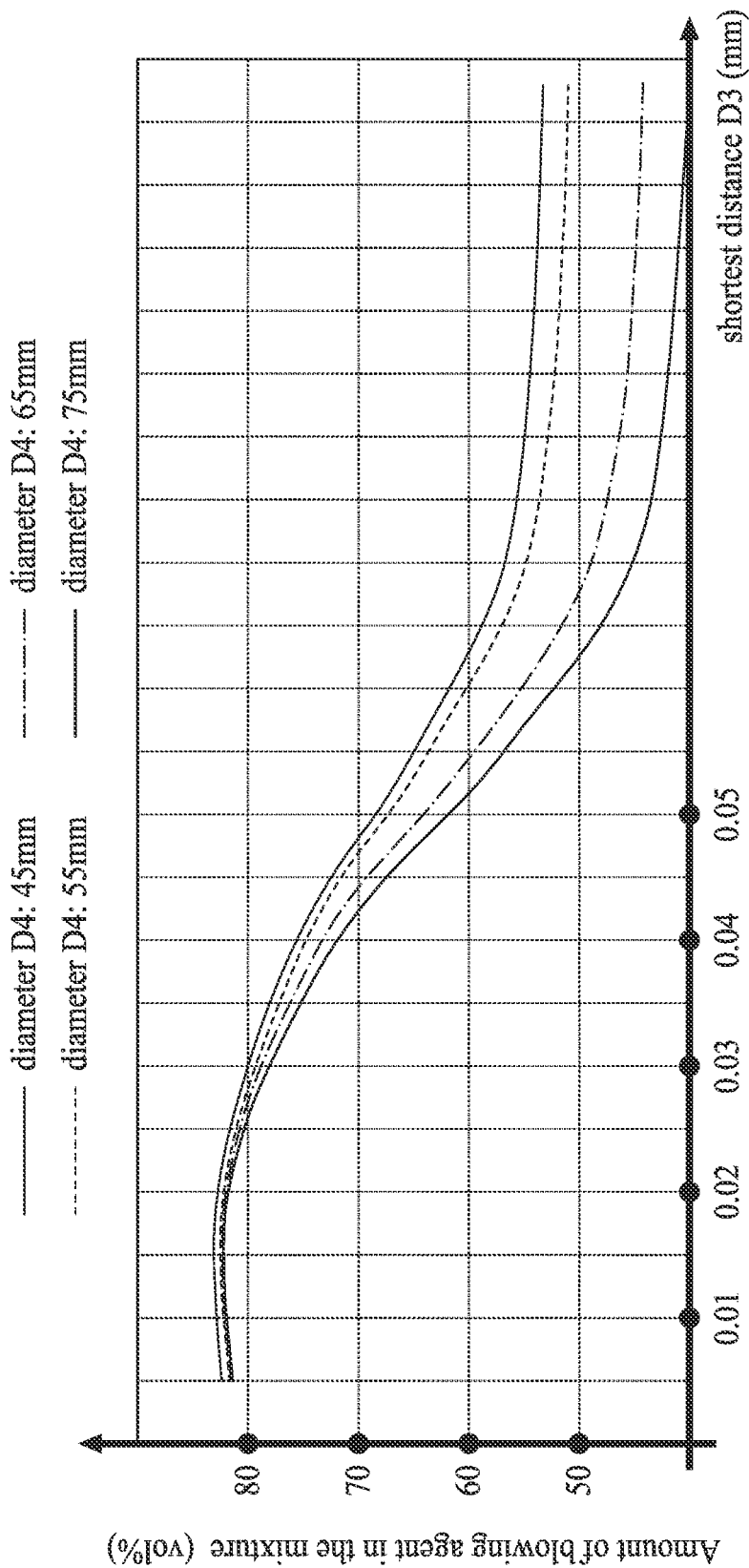
FIG. 31 is a chart illustrating the behavior of the amount of blowing agent in the mixture versus the shortest distance according to one embodiment of the present invention.

In some embodiments, when the shortest distance D3 is substantially less than 0.01 mm, the blowing agent in a predetermined amount of the mixture is substantially greater than 0.8 per $cm^3$, as shown in FIG. 31. In some embodiments, if the blowing agent in the predetermined amount of the mixture is substantially greater than 0.8 per $cm^3$, a bubble density in the predetermined amount of the mixture after foaming is substantially greater than 180000 per $cm^3$.

Figure 32:
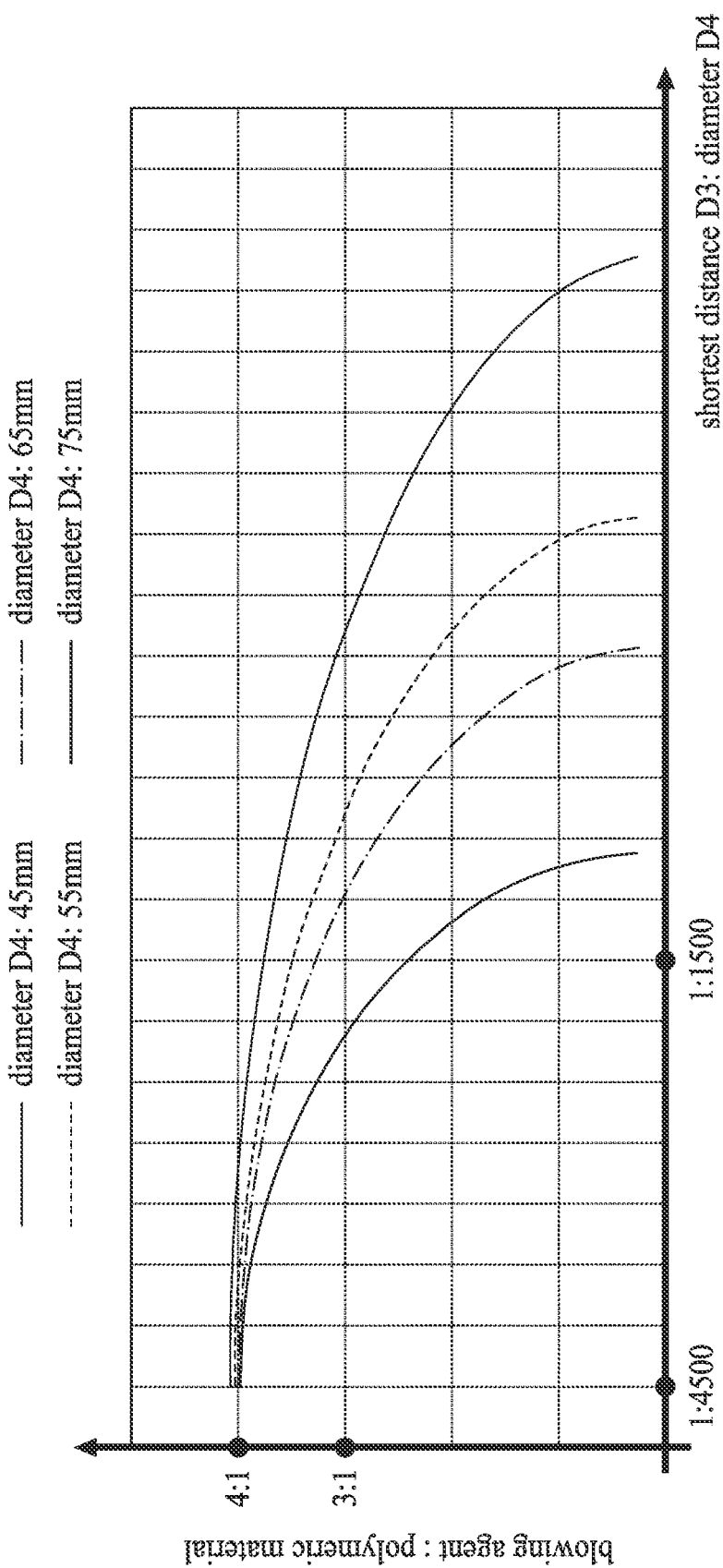
FIG. 32 is a chart illustrating the behavior of the ratio of the blowing agent to the polymeric material versus the ratio of the shortest distance to the diameter of the mixing rotor according to one embodiment of the present invention.

In some embodiments, when the ratio of the shortest distance D3 to the distance D4 ranges between 1:1500 and 1:4500, an evenness of the blowing agent to the polymeric material is optimized. In other words, a mixing of the blowing agent and the polymeric material by the mixing rotor 134 is even and uniform. In some embodiments, when the ratio of the shortest distance D3 to the distance D4 ranges between 1:1500 and 1:4500, a ratio of the blowing agent to the polymeric material in a predetermined amount of the mixture ranges between 4:1 to 3:1 as shown in FIG. 32. In some embodiments, the ratio of the blowing agent to the polymeric material in the predetermined amount of the mixture is about 1:1. In some embodiments, if the ratio of the blowing agent to the polymeric material in the predetermined amount of the mixture ranges between 4:1 and 3:1 ratio of bubbles to the polymeric material in the predetermined amount of the mixture after foaming also ranges between 4:1 and 3:1. In some embodiments, the ratio of the bubbles to the polymeric material in the predetermined amount of the mixture after foaming is about 4:1.

In some embodiments, referring back to FIG. 29, the melting unit 120 includes a hollow pressing cartridge 121 configured to accommodate the polymeric material and having a first pressure, and the mixing unit 130 includes a hollow mixing cartridge 131 having a second pressure. In some embodiments, in order to prevent backflow, the first pressure is greater than the second pressure. In some embodiments, the polymeric material is drawn from the melting unit 120 toward the mixing unit 130 by the difference between the first pressure and the second pressure.

The blowing agent supply unit 140 is connected to the mixing unit 130 and configured to convey the blowing agent into the mixing unit 130. In some embodiments, the blowing agent supply unit 140 is positioned between the first flow control element 161 and the second flow control element 162. In some embodiments; the blowing agent supply unit 140 is disposed proximal to the first flow control element 161 and distal to the second flow control element 162.

In some embodiments, a blowing agent source (not shown) is connected to the blowing agent supply unit 140 and is configured to supply any type of blowing agent known to those of ordinary skill in the art. In some embodiments, the blowing agent is in the supercritical fluid state after being introduced into the mixing unit 130 by the blowing agent supply unit 140.

In some embodiments, the first flow control element 161 is disposed at a first port 171 that connects the melting unit 120 to the mixing unit 130. The first port 171 is configured to introduce the polymeric material from the melting unit 120 into the mixing unit 130. The first port 171 is located between the melting unit 120 and the mixing unit 130. In some embodiments, the first port 171 is configured to introduce the polymeric material from the pressing cartridge 121 of the melting unit 120 into the mixing cartridge 131 of the mixing unit 130. In some embodiments, the polymeric material can be conveyed and/or drawn from the melting unit 120 to the mixing unit 130 through the first port 171 by a pressure difference between the first pressure and the second pressure.

In some embodiments, the first flow control element 161 is disposed between the melting unit 120 and the mixing unit 130 and is configured to control flow of the polymeric material from the melting unit 120 to the mixing unit 130. The first flow control element 161 may be a valve, a movable cover or the like.

In some embodiments, the first flow control element 161 is configured to switch between an open configuration and a closed configuration. The open configuration of the first flow control element 161 allows the polymeric material to flow from the melting unit 120 into the mixing unit 130, and the closed configuration of the first flow control element 161 prevents the polymeric material from flowing from the mixing unit 130 back to the melting unit 120.

In some embodiments, the first flow control element 161 is configured to maintain a pressure difference between the melting unit 120 and the mixing unit 130. In some embodiments, the first flow control element 161 is configured to maintain a pressure difference between the melting unit 120 and the mixing unit 130 by switching between the open configuration and the closed configuration, so that the polymeric material is not able to flow from the mixing cartridge 131 of the mixing unit 130 back to the pressing cartridge 121 of the melting unit 120. In some embodiments, the first flow control element 161 is configured to adjust the first pressure and/or the second pressure in order to maintain the pressure difference between the first pressure and the second pressure. In some embodiments, the first flow control element 161 is in the closed configuration when the first pressure is similar to the second pressure.

In some embodiments, the injection unit 150 is configured to receive the mixture discharged from the second discharging passage 133 of the mixing unit 130 and to discharge the mixture out of the injection unit 150. In some embodiments, the injection unit 150 is configured to inject the mixture, and the discharging channel 50 is communicable with the injection unit 150.

In some embodiments, the injection unit 150 includes a hollow metering cartridge 151 configured to accommodate the mixture. The metering cartridge 151 has a hollow inner space 1511, wherein the inner space 1511 is in communication with the second discharging passage 133 and configured to accommodate the mixture. The injection unit 150 further includes a connecting passage 152 in communication with the inner space 1511 of the metering cartridge 151 and a discharging member 153 slidably disposed in the inner space 1511 of the metering cartridge 151 and configured to discharge the mixture out of the metering cartridge 151 through an outlet 154.

In some embodiments, the mixture is flowed from the injection unit 150 into the discharging channel 50. In some embodiments, the mixture is the first material M1 and/or the second material M2.

An aspect of this disclosure relates to an article. The article includes a foamed member including a polymeric material; and a core embedded in the foamed member; wherein the core includes a first surface, a second surface opposite to the first surface, and a sidewall between the first surface and the second surface, the foamed member covers at least a portion of the first surface, and covers the entire sidewall and the entire second surface.

In some embodiments, the core includes a through hole extending between the first surface and the second surface. In some embodiments, a recess indented into the core and disposed at the first surface, the second surface or the sidewall. In some embodiments, the core includes a protrusion protruded from the first surface, the second surface or the sidewall, and the protrusion is surrounded by the foamed member. In some embodiments, the article further comprising a component disposed over the core and the foamed member, and a portion of the foamed member is disposed between the component and the core. In some embodiments, the core is enclosed by the foamed member.

An aspect of this disclosure relates to a method of manufacturing an article. The method includes providing a molding device, wherein the molding device includes a first mold, a second mold corresponding to the first mold, the first mold includes an inner wall and a supporting member protruded from the inner wall; disposing a core on the supporting member; disposing the second mold over the first mold to form a mold cavity defined by the first mold and the second mold, wherein the core is disposed within the mold cavity; injecting a first material into the mold cavity; and foaming the first material to form a first foamed member; wherein at least a portion of the first foamed member is in contact with the core.

In some embodiments, the method further includes retracting the supporting member into the first mold or removing the supporting member from the mold cavity during or after the injecting the first material. In some embodiments, the method further includes injecting a second material into the mold cavity after the supporting member is removed or retracted. In some embodiments, a ratio of a polymeric material to a blowing agent in the first material is substantially equal to a ratio of the polymeric material to the blowing agent in the second material. In some embodiments, the method further includes forming a mark on the first foamed member at a position corresponding to the supporting member. In some embodiments, the method further includes injecting a gas into the mold cavity to increase a pressure in the mold cavity to a first predetermined pressure before the injecting the first material. In some embodiments, the method further includes discharging a gas from the mold cavity to decrease a pressure in the mold cavity to a second predetermined pressure. In some embodiments, at least a portion of the first material is disposed within a recess or a through hole of the core.

In some embodiments, at least a portion the first material is disposed between the inner wall and the core. In some embodiments, the supporting member includes a plurality of supporting units protruded from the inner wall, and at least a portion the first material is disposed between the supporting units. In some embodiments, the core includes a first surface contacting the supporting member, a second surface opposite to the first surface, and a sidewall between the first surface and the second surface, the first foamed member is in contact with at least a portion of the first surface, and covers the entire sidewall and the entire second surface. In some embodiments, the method further incudes disposing a component within an opening of the second mold prior to the injection of the first material. In some embodiments, at least a portion of the first material is disposed between the component and the core after the injecting the first material. In some embodiments, the method further includes providing an extruding system configured to produce the first material and having a melting unit and a mixing unit and providing a discharging channel communicable with the extruding system and including an outlet disposed distal to the extruding system and configured to discharge the molding material, wherein a feeding port of the molding device is correspondingly engageable with the outlet.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein, may be utilized according to the present invention. Accordingly, the appended claims are intended to include within their scope such processes, machines, manufacture, compositions of matter, means, methods and steps.

What is claimed is:

1. A method of manufacturing an article, comprising:
   providing a molding device, wherein the molding device includes a first mold, a second mold corresponding to the first mold, the first mold includes an inner wall and a supporting member protruded from the inner wall;
   providing a mixing unit configured to produce a first material and a second material, wherein the mixing unit includes a hollow mixing cartridge and a mixing rotor disposed in the hollow mixing cartridge, a length of the mixing rotor extends along a length of the hollow mixing cartridge, and the mixing rotor is immovable in a direction parallel to the longitudinal axis of the hollow mixing cartridge, a ratio of a shortest distance between an inner sidewall of the hollow mixing cartridge and the mixing rotor to a diameter of the mixing rotor is in a range of about 1:1500 to about 1:4500;
   providing a discharging channel communicable with the mixing unit configured to discharge the first material and the second material from the mixing unit;
   disposing a core on the supporting member, wherein the core includes a first surface, a second surface opposite to the first surface, and a sidewall between the first surface and the second surface;
   engaging the second mold with the first mold to form a mold cavity defined by the first mold and the second mold, wherein the core is disposed within the mold cavity;
   injecting the first material into the mold cavity;
   foaming the first material to form a first foamed member, wherein the first foamed member covers a first portion of the first surface, the entire sidewall and the entire second surface of the core;
   discharging a gas from the mold cavity to decrease a pressure in the mold cavity during or after the foaming of the first material;
   retracting the supporting member into the first mold or removing the supporting member from the mold cavity to only expose a second portion of the first surface through the first foamed member after the foaming of the first material; and
   injecting the second material into the mold cavity to form a second foamed member at the entire second portion of the first surface,
   wherein the second foamed member is separated from the sidewall and the second surface of the core, and the core is completely embedded by the first foamed member and the second foamed member.

2. The method of claim 1, wherein the first material is injected into the mold cavity through a feeding port disposed at the second mold.

3. The method of claim 1, wherein a first end of the second foamed member is in contact with the second portion of the first surface of the core, a periphery of the second foam member is in contact with the first foam member, and a second end of the second foamed member opposite to the first end is exposed through an outer surface of the first foamed member.

4. The method of claim 1, wherein a ratio of a polymeric material to a blowing agent in the first material is substantially equal to a ratio of the polymeric material to the blowing agent in the second material.

5. The method of claim 1, wherein after the retracing the supporting member, a mark is formed on the first foamed member at a position corresponding to the supporting member, and the second material is injected into the mark to form the second foamed member at the entire second portion of the first surface.

6. The method of claim 1, further comprising:
   injecting the gas into the mold cavity to increase the pressure in the mold cavity to a first predetermined pressure before the injecting the first material.

7. The method of claim 1, wherein the gas in the mold cavity is discharged until the pressure in the mold cavity is within a predetermined pressure range.

8. The method of claim 1, wherein at least a portion of the first material is disposed within a recess or a through hole of the core.

9. The method of claim 1, wherein at least a portion the first material is disposed between the inner wall and the core.

10. The method of claim 1, wherein the supporting member includes a first supporting unit, a second supporting unit and a third supporting unit protruded from the inner wall, a distance between the first supporting unit and the second supporting unit is equal to a distance between the second supporting unit and third supporting unit, and at least a portion the first material is disposed between the first supporting unit and the second supporting unit.

11. The method of claim 1, further comprising:
providing a melting unit configured to convey the polymeric material into the mixing unit,
wherein the melting unit includes a pressing cartridge and a pushing member disposed in the pressing cartridge, a length of the pushing member extends along a length of the pressing cartridge, and the pushing member is immovable in a direction parallel to the longitudinal axis of the pressing cartridge.

12. The method of claim 1, further comprising:
disposing a component within an opening of the second mold prior to the injection of the first material.

13. The method of claim 12, wherein at least a portion of the first material is disposed between the component and the core after the injecting the first material.

14. The method of claim 11, wherein a ratio of a shortest distance between an inner sidewall of the pressing cartridge and the pushing member to a diameter of the pushing member is in a range of about 1:1500 to about 1:4500.

15. A method of manufacturing an article, comprising:
providing a molding device, wherein the molding device includes a first mold, a second mold corresponding to the first mold, the first mold includes an inner wall and a supporting member protruded from the inner wall;
providing a mixing unit configured to produce a first material and a second material, wherein the mixing unit includes a hollow mixing cartridge and a mixing rotor disposed in the hollow mixing cartridge, a length of the mixing rotor extends along a length of the hollow mixing cartridge, and the mixing rotor is immovable in a direction parallel to the longitudinal axis of the hollow mixing cartridge, a ratio of a shortest distance between an inner sidewall of the hollow mixing cartridge and the mixing rotor to a diameter of the mixing rotor is in a range of about 1:1500 to about 1:4500;
providing a discharging channel communicable with the mixing unit configured to discharge the first material and the second material from the mixing unit;
disposing a core on the supporting member, wherein the core includes a first surface, a second surface opposite to the first surface, and a sidewall between the first surface and the second surface;
engaging the second mold with the first mold to form a mold cavity defined by the first mold and the second mold, wherein the core is disposed within the mold cavity;
injecting the first material into the mold cavity;
foaming the first material to form a first foamed member, wherein the first foamed member covers a first portion of the first surface, the entire sidewall and the entire second surface of the core;
retracting the supporting member into the first mold or removing the supporting member from the mold cavity during or after the injecting the first material to expose a second portion of the first surface through the first foamed member;
forming a mark at a position on the first foamed member corresponding the position of the supporting member; and
injecting the second material into the mark to form a second foamed member at the second portion of the first surface,
wherein the second foamed member is separated from the sidewall and the second surface of the core, and the core is surrounded by the first foamed member and the second foamed member, and the mark is recessed from an outer surface of the first foamed member.

16. The method of claim 15, further comprising:
injecting a gas into the mold cavity to increase a pressure in the mold cavity to a first predetermined pressure before the injecting the first material.

17. The method of claim 15, wherein a first end of the second foamed member is in contact with the core, a periphery of the second foamed member is in contact with the first foamed member, and a second end of the second foamed member opposite the first end is exposed from the outer surface of the first foamed member, and the periphery of the second foamed member is between the first end and the second end.

18. The method of claim 15, further comprising taking the first foamed member and the core out of the molding device.

19. The method of claim 15, further comprising:
disposing a component within an opening of the second mold prior to the injection of the first material;
wherein the first material is injected into the mold cavity between the component and the inner wall of the first mold, and the component is in contact with the first material during formation of the first foamed member.

20. The method of claim 18, wherein the injecting the second material is performed after the taking the first foamed member and the core out of the molding device.

* * * * *